US009031338B2

(12) United States Patent
Shimizu et al.

(10) Patent No.: US 9,031,338 B2
(45) Date of Patent: *May 12, 2015

(54) IMAGE ENCODING METHOD AND APPARATUS, IMAGE DECODING METHOD AND APPARATUS, AND PROGRAMS THEREFOR

(75) Inventors: Shinya Shimizu, Yokosuka (JP); Norihiko Matsuura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 13/822,836

(22) PCT Filed: Sep. 21, 2011

(86) PCT No.: PCT/JP2011/071463
§ 371 (c)(1),
(2), (4) Date: Mar. 13, 2013

(87) PCT Pub. No.: WO2012/043330
PCT Pub. Date: Apr. 5, 2012

(65) Prior Publication Data
US 2013/0170763 A1    Jul. 4, 2013

(30) Foreign Application Priority Data

Sep. 29, 2010    (JP) .................................. 2010-218036

(51) Int. Cl.
*G06K 9/36* (2006.01)
*G06T 9/00* (2006.01)
(Continued)

(52) U.S. Cl.
CPC ............ *G06T 9/004* (2013.01); *H04N 13/0048* (2013.01); *H04N 2213/003* (2013.01);
(Continued)

(58) Field of Classification Search
None
See application file for complete search history.

(56) References Cited

U.S. PATENT DOCUMENTS 5,838,455 A    11/1998    Imaizumi et al.
6,320,981 B1    11/2001    Yada
(Continued)

FOREIGN PATENT DOCUMENTS

JP    A-09-289638    11/1997
JP    A-2003-304562    10/2003
(Continued)

OTHER PUBLICATIONS

Morvan, Yannick, and Dirk Farin. "Platelet-based coding of depth maps for the transmission of multiview images." Electronic Imaging 2006. International Society for Optics and Photonics, 2006.*
(Continued)

*Primary Examiner* — Li Liu
(74) *Attorney, Agent, or Firm* — Harness, Dickey & Pierce, P.L.C.

(57) ABSTRACT

An image encoding method in which when transmitting or storing an image, a frame of the image is divided into predetermined-sized processing regions, and for each processing region, a pixel value of each pixel is predicted for the encoding. The method includes a step that determines one pixel value, which is assigned to and represents each object in the processing region, to be an object pixel value that is associated with an object identifier for identifying the relevant object; a step that generates, based on each object pixel value and the pixel value of each pixel in the processing region, an object map that indicates which object has been obtained at each pixel in the processing region, by using the object identifier; a step that generates a predicted image for the processing region by assigning the object pixel value to each pixel in accordance with the object map; a step that encodes the object map; a step that encodes each object pixel value; and a step that performs predictive encoding of an image signal for the processing region by using the predicted image.

24 Claims, 22 Drawing Sheets

(51) Int. Cl.
- H04N 13/00 (2006.01)
- H04N 19/597 (2014.01)
- H04N 19/176 (2014.01)
- H04N 19/46 (2014.01)
- H04N 19/463 (2014.01)
- H04N 19/20 (2014.01)

(52) U.S. Cl.
CPC ........... *H04N19/597* (2013.01); *H04N 19/176* (2013.01); *H04N 19/46* (2013.01); *H04N 19/463* (2013.01); *H04N 19/20* (2013.01)

(56) References Cited

U.S. PATENT DOCUMENTS

| | | | |
|---|---|---|---|
| 7,245,768 | B1* | 7/2007 | Harman et al. ............... 382/232 |
| 7,894,633 | B1* | 2/2011 | Harman ........................ 382/106 |
| 2002/0039441 | A1 | 4/2002 | Klassen |
| 2002/0154693 | A1 | 10/2002 | Demos et al. |
| 2004/0022322 | A1 | 2/2004 | Dye |
| 2005/0063596 | A1 | 3/2005 | Yomdin et al. |
| 2007/0269116 | A1 | 11/2007 | Lo |
| 2009/0097557 | A1 | 4/2009 | Takahashi et al. |
| 2010/0231688 | A1* | 9/2010 | Park et al. ....................... 348/42 |
| 2011/0206288 | A1* | 8/2011 | Lee et al. ..................... 382/233 |
| 2012/0200669 | A1* | 8/2012 | Lai et al. ......................... 348/43 |

FOREIGN PATENT DOCUMENTS

| | | |
|---|---|---|
| JP | 2006-148892 A | 6/2006 |
| JP | A-2006-518157 | 8/2006 |
| JP | 2009-212664 A | 9/2009 |
| JP | 2009-296338 A | 12/2009 |
| JP | A-2010-157825 | 7/2010 |
| JP | 2010-266982 A | 11/2010 |
| JP | 2012-074918 A | 4/2012 |
| WO | 98/15915 A1 | 4/1998 |
| WO | 01/84846 A2 | 11/2001 |
| WO | 2004/075531 A2 | 9/2004 |
| WO | 2009/112742 A1 | 9/2009 |

OTHER PUBLICATIONS

Shen, Godwin, et al. "Edge-aware intra prediction for depth-map coding." Image Processing (ICIP), 2010 17th IEEE International Conference on. IEEE, 2010.*

C. Fehn, P. Kauff, M. Op de Beeck, F. Ernst, W. IJsselsteijn, M. Pollefeys, L. Van Gool, E. Ofek and I. Sexton. "An Evolutionary and Optimised Approach on 3D-TV", Proceedings of International Broadcast Conference, pp. 357-365, Amsterdam, The Netherlands, Sep. 2002 (published on 2003).

W.H.A. Bruls, C. Varekamp, R. Klein Gunnewiek, B. Barenbrug and A. Bourge, "Enabling Introduction of Stereoscopic (3D) Video: Formats and Compression Standards", Proceedings of IEEE International Conference on Image Processing, pp. 1-89 to 1-92, San Antonio, USA, Sep. 2007.

A. Smolic, K. Mueller, P. Merkle, N. Atzpadin, C. Fehn, M. Mueller, O. Schreer, R. Tanger, P. Kauff and T. Wiegand, "Multi-view video plus depth (MVD) format for advanced 3D video systems". Joint Video Team of ISO/IEC JTC1/SC29/WG11 and ITU-T SG16 Q.6, Doc. JVT-W100, San Jose, USA, Apr. 2007.

C. L. Zitnick, S. B. Kang, M. Uyttendaele, S. A. J. Winder, and R. Szeliski, "High-quality Video View Interpolation Using a Layered Representation", ACM Transactions on Graphics, vol. 23, No. 3, pp. 600-608, Aug. 2004.

Recommendation ITU-T H.264, "Advanced video coding for generic audiovisual services", Mar. 2009.

Shin'ya Shimizu et al., "Kokoritsu Depth Map Fugoka no Tameno Object Base Yosoku Hoshiki", The Institute of Image Electronics Engineers of Japan Nenji Taikai Yokoshu (CD-ROM), The Institute of Image Electronics Engineers of Japan, Jun. 25, 2011, Dai 39 Kai, RI-4.

Kunio Nobori et al., "Object-based image coding using range data", The Institute of Electronics, Information and Communication Engineers Sogo Taikai Koen Ronbunshu, The Institute of Electronics, Information and Communication Engineers, Mar. 8, 1999, Joho System (2), p. 64.

D.V.S.X. De Silva et al., Object Based Coding of the Depth Maps for 3D Video Coding, Consumer Electronics, IEEE Transactions on, IEEE, Aug. 31, 2009, vol. 55, Issue: 3, p. 1699-1706.

Shin'ya Shimizu et al., Block-Adaptive Palette-Based Prediction for Depth Map Coding, 18th IEEE International Conference on Image Processing, 2011, pp. 117-120.

International Search Report for PCT/JP2011/071463, ISA/JP, mailed Nov. 8, 2011.

Tzovaras, Dimitrios, et al., "Object-Based Coding of Stereo Image Sequences Using Joint 3-D Motion/Disparity Compensation," IEEE Transactions on Circuits and Systems for Video Technology, vol. 7, No. 2, Apr. 1997, pp. 312-327.

Ebrahimi, Touradj, et al., "MPEG-4 natural video coding—An overview," Signal Processing: Image Communication, vol. 15, Nos. 4-5, Jan. 2000, pp. 365-385.

Search Report, European Patent Application No. 11828887.7, Jun. 18, 2014.

Zhu, Bo, et al., "View Synthesis Oriented Depth Map Coding Algorithm," 2009 Asia-Pacific Conference on Information Processing, pp. 104-107.

Lie, Wen-Nung, et al., "Multi-spectral Satellite Image Compression Based on Multi-Mode Linear Prediction," Proc. of SPIE, Visual Communications and Image Processing, 2000, pp. 848-855.

Search Report, European Patent Application No. 11828851.3, Jun. 18, 2014.

Office Action, Taiwanese Patent Application No. 100134543, Oct. 13, 2014.

Office Action, Taiwanese Patent Application No. 100134544, Jul. 16, 2014.

Morvan, Yannick, et al., "Depth-Image Compression Based on an R-D Optimized Quadtree Decomposition for the Transmission of Multiview Images," IEEE International Conference on Image Processing, Sep. 1, 2007, pp. V-105-V-108.

Search Report, International Patent Application No. PCT/JP2011/071315, Nov. 8, 2011.

Search Report, International Patent Application No. PCT/JP2012/056442, Jun. 19, 2012.

Search Report, European Patent Application No. 12757661.9, Oct. 21, 2014.

Notice of Non-Final Rejection, Korean Patent Application No. 10-2013-7023849, Feb. 26, 2015.

Examination Report from the Intellectual Property Office, Taiwanese Patent Application No. 101108263, Mar. 20, 2015.

* cited by examiner

FIG. 4

| 0 | 0 | 0 | 0 | 0 | 0 | 0 | 2 |
|---|---|---|---|---|---|---|---|
| 0 | 0 | 0 | 0 | 0 | 0 | 2 | 2 |
| 0 | 0 | 0 | 0 | 1 | 1 | 2 | 2 |
| 0 | 0 | 0 | 0 | 1 | 1 | 1 | 2 |
| 0 | 0 | 1 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 1 | 1 | 1 | 1 | 1 | 1 | 1 |

FIG. 5 x: ENCODING TARGET PIXEL
a,b,c: REFERENCE PIXEL

| a | b |
|---|---|
| c | x |

27 PATTERNS FOR OBJECT IDENTIFIERS AT REFERENCE PIXELS

FIG. 14

| 0 | 0 | 0 | 0 | 0 | 2 | 2 | 2 |
|---|---|---|---|---|---|---|---|
| 0 | 0 | 0 | 0 | 2 | 2 | 2 | 2 |
| 0 | 0 | 0 | 0 | 1 | 1 | 2 | 2 |
| 0 | 0 | 0 | 0 | 1 | 1 | 1 | 2 |
| 0 | 0 | 0 | 0 | 1 | 1 | 1 | 2 |
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |

FIG. 15

```
num_objects
map_object
for ( i=0; i<num_objects; i++)
{
        if ( exist(i, map_object) == TRUE )
                residual_value_object[i]
}
residuals
```

IMAGE ENCODING METHOD AND APPARATUS, IMAGE DECODING METHOD AND APPARATUS, AND PROGRAMS THEREFOR

TECHNICAL FIELD

The present invention relates to image encoding and decoding techniques, and in particular, relates to an image encoding method, an image decoding method, an image encoding apparatus, an image decoding apparatus, and programs therefor, which are suitable for coding an image such as a distance image.

Priority is claimed on Japanese Patent Application No. 2010-218036, filed Sep. 29, 2010, the contents of which are incorporated herein by reference.

BACKGROUND ART

A distance image is an image in which the distance from a camera to an object (or subject) is represented by a pixel value. Since the distance from a camera to an object can be defined as the depth of a scene, the distance image is often called a "depth image". In addition, it is sometimes called a "depth map". In the technical field of computer graphics, since the depth is information stored in a Z buffer (i.e., a memory region for storing depth values of the entire image), the distance image is often called a "Z image" or a "Z map". Additionally, instead of the distance from a camera to an object, coordinate values for the Z axis in a three-dimensional coordinate system in space may be used to represent a distance (or depth).

Generally, in an obtained image, the X and Y axes are respectively defined as the horizontal and vertical directions, and the Z axis is defined in the direction of the relevant camera. However, when, for example, a common coordinate system is used between a plurality of cameras, the Z axis may not be defined in the direction of a camera.

Below, distance, depth, and Z values (depth information) are not distinguished from each other, and are commonly called "distance information". Additionally, an image in which distance information is represented by pixel values is called a "distance image".

In order to represent distance information by using pixel values, there are three methods: (i) a method in which values corresponding to physical quantities are directly defined as pixel values, (ii) a method that uses values obtained by quantizing a section between the minimum and maximum values into discrete values, and (iii) a method that uses values obtained by quantizing a difference from the minimum value by using a specific step width. When the range for desired representation has a considerable limit, distance information can be highly accurately represented by using additional information such as the minimum value.

In addition, when performing quantization at regular intervals, there are two methods: a first method of directly quantizing physical values, and a second method of quantizing the inverse numbers of physical values. Generally, the inverse number of the distance image is proportional to disparity. Therefore, in order to highly accurately represent the distance information, the former method is often used. Oppositely, in order to highly accurately represent disparity information, the latter method is often used.

Below, regardless of the method of representing the distance image using pixel values or the quantization method, any image as a representative of distance information is called "distance information".

The distance image may be applied to 3D image. In a generally known 3D image representation, a stereographic image consists of a right-eye image and a left-eye image of an observer. A 3D image may also be represented using an image obtained by a certain camera and a distance image therefor (refer to Non-Patent Document 1 for a detailed explanation thereof).

In order to encode a 3D image represented using a video image at a specific viewpoint and a distance image, the method defined by MPEG-C Part 3 (ISO/IEC 23002-3) can be used (refer to Non-Patent Document 2 for a detailed explanation thereof).

In addition, when such a video and a distance image are obtained for a plurality of viewpoints, a 3D image having a disparity larger than that obtained by a single viewpoint can be represented (refer to Non-Patent Document 3 for a detailed explanation thereof).

Instead of representing the above-described 3D image, the distance image is also used as one of data items for generating a free-viewpoint image by which the observer's viewpoint can be freely shifted without consideration of the camera arrangement. Such a synthetic image obtained by assuming an observation of a scene from a camera other than cameras which are actually used for imaging may be called a "virtual viewpoint image", where methods for generating the virtual viewpoint image have been actively examined in the technical field of image-based rendering. Non-Patent Document 4 discloses a representative method for generating the virtual viewpoint image based on a multi-viewpoint video and a distance image.

Since a distance image is formed using a single component, it can be regarded as a gray-scale image. Additionally, an object is present continuously in a real space, and thus it cannot instantaneously move to a distant position. Therefore, similar to image signals, the distance image has spatial and temporal correlation. Accordingly, it is possible to efficiently encode a distance image or a distance video by using an image or video encoding method used for encoding an ordinary image or video signal, while removing spatial or temporal redundancy. Actually, in MPEG-C Part 3, distance video image encoding is assumed to be performed by an existing video encoding method.

Below, a known method of encoding an ordinary video signal will be explained.

Since each object generally has spatial and temporal continuity in real space, appearance of the object has high spatial and temporal correlation. In the video signal encoding, an efficient encoding is achieved utilizing such correlation.

More specifically, the video signal of an encoding target block is predicted based on the video signal of a previously-encoded video signal, and only a residual signal thereof is encoded, thereby reducing information which should be encoded and implementing a high degree of encoding efficiency.

As a representative method of predicting a video signal, there are (i) intra frame prediction that spatially generates a predicted signal based on neighbor (or neighboring) blocks, and (ii) motion compensation prediction that estimates movement of an object in accordance with previously-encoded frames obtained at different times, so as to temporally generate a predicted signal.

In addition, in order to utilize spatial correlation and characteristics of human visual systems, a prediction error called a prediction residual signal is transformed into data in a frequency domain by using DCT or the like, so that energy of the residual signal is concentrated into a low-frequency region, thereby the efficient encoding is achieved.

Detailed explanations of each method can be found in international standards for video encoding, such as MPEG-2 or H.264/MPEG-4 AVC (see Non-Patent Document 5).

PRIOR ART DOCUMENT

Patent Document

Non-Patent Document 1: C. Fein, P. Kauff, M. Op de Beeck, F. Ernst, W. IJsselsteijn, M. Pollefeys, L. Van Gool, E. Ofek and I. Sexton, "An Evolutionary and Optimised Approach on 3D-TV", Proceedings of International Broadcast Conference, pp. 357-365, Amsterdam, The Netherlands, September 2002.

Non-Patent Document 2: W. H. A. Bruls, C. Varekamp, R. Klein Gunnewiek, B. Barenbrug and A. Bourge, "Enabling Introduction of Stereoscopic (3D) Video: Formats and Compression Standards", Proceedings of IEEE International Conference on Image Processing, pp. I-89 to I-92, San Antonio, USA, September 2007.

Non-Patent Document 3: A. Smolic, K. Mueller, P. Merkle, N. Atzpadin, C. Fehn, M. Mueller, O. Schreer, R. Tanger, P. Kauff and T. Wiegand, "Multi-view video plus depth (MVD) format for advanced 3D video systems", Joint Video Team of ISO/IEC JTC1/SC29/WG11 and ITU-T SG16 Q.6, Doc. JVT-W100, San Jose, USA, April 2007.

Non-Patent Document 4: C. L. Zitnick, S. B. Kang, M. Uyttendaele, S. A. J. Winder, and R. Szeliski, "High-quality Video View Interpolation Using a Layered Representation", ACM Transactions on Graphics, vol. 23, no. 3, pp. 600-608, August 2004.

Non-Patent Document 5: Recommendation ITU-T H.264, "Advanced video coding for generic audiovisual services", March 2009.

DISCLOSURE OF INVENTION

Problem to be Solved by the Invention

Since each object (subject) is continuous in real space, it has a high spatial correlation. In addition, since each object cannot instantaneously move to a distant place, it has a high temporal correlation. Therefore, an existing video encoding method using spatial and temporal correlation can be used to efficiently encode a distance image represented as a gray scale image.

However, there is small variation inside each object, while there is a large difference between objects. Therefore, the result of spatial or temporal prediction is one of accurate prediction which produces a very small prediction error and totally ineffective prediction which produces a very large prediction error. That is, a sharp edge is generated in the prediction residual image. When the prediction residual image is transformed into data in a frequency domain by using DCT or the like, the above-described edge obstructs energy concentration of the residual signal onto the low-frequency region, so that various high frequency components are produced. As a result, it is impossible to achieve an efficient encoding of the residual signal.

FIG. 23 shows an example of a 9×9 pixel block of a distance image. Two objects are present in this block, one of them having a pixel value of approximately 50 and the other having a pixel value of approximately 200.

In spatial prediction, 8×8 pixels except for information of the first line and the first column of this block are predicted. Although various prediction methods can be used, typical two prediction methods such as horizontal prediction and vertical prediction, which are employed in H.264, are explained here.

As shown on the right side of FIG. 23, the prediction residual has only three groups of values, such as approximately -150, 0, and 150, which causes considerably sharp edges.

FIGS. 24A and 24B show results of subjecting the prediction residual shown in FIG. 23 to 8×8 two-dimensional DCT. The direct current (DC) component is present in the backmost area in each figure, and the larger the distance from the backmost area, the higher the frequency.

As shown in the figures, in either case, large-size signals are produced in many high-frequency areas, which indicates a failure in downsizing of the residual signal.

Although encoding can be performed by using only transformation such as DCT without performing prediction, it is impossible to exclude spatial correlation with another block, which further degrades the encoding efficiency.

In addition, although encoding can be performed without performing transformation such as DCT, it is impossible to utilize local correlation within the relevant block, so that efficient encoding cannot be achieved.

In light of the above circumstances, an object of the present invention is to provide an image encoding technique for efficiently encoding an image whose pixel values (e.g., distance image) considerably depend on the object, and an image decoding technique for decoding the relevant encoded bit stream.

Means for Solving the Problem

The present invention relates to image encoding in which when transmitting or storing an image, a frame of the image is divided into predetermined-sized processing regions (which may be called "blocks" below), and for each block, the pixel value of each pixel is predicted for the encoding. In order to solve the above problems, the present invention assumes that a fixed or variable number of objects are present in each block, and the image of each block is represented using information items such as a pixel value that represents each object (called an "object pixel value") and object identification information for each pixel.

That is, an object identification information item assigned to each pixel in a block represents an object of the pixel, and a specific object pixel value is assigned to each object identification information item.

Since a most approximate value according to such information is assigned to each pixel, a predicted image that maintains a complex edge shape can be generated. Here, only a few objects are included in each block at most. Therefore, the amount of the above information is limited.

The "object" of this specification does not indicate each body or human itself to be imaged but a target to which information is applied, in other words, a region having similar image signals (about luminance, color, or depth). That is, even a single body is regarded as a plurality of objects if the body has different colors at divided regions.

In addition, a body or a part of a body, for which no encoding of image signals is required, is not determined to be an object. That is, the object does not relate to real objects in the frame, and each real object to which no information is applied is not an "object" of the present invention.

Additionally, if two information items are applied to one real object, two separate objects are defined.

Below, terms used in explanations of the present invention and embodiments therefor will be explained, where processing regions are represented by blocks.

Object Number

The object number indicates the number of objects that are present in each block, and the number of targets to which information is applied. The object number can be generated by analyzing the pixel values in the block.

For example, pixels in a block are subjected to clustering using information such as pixel values or positions, and the maximum value for the number of clusters, each of which has a score (e.g., variance of the pixel values) smaller than or equal to a specific value, may be determined to be the object number. In other examples, the object number may be provided from an external device based on experiences or the like, or may be set to a predetermined value.

The object number is used to represent the number of object pixel values which are one of additional information items, and also for representing the maximum value of object identifiers which are shown in an object map.

Object Pixel Value

One object pixel value is assigned to each "object", and is representative of the object. As the pixel value, luminance, color difference value, or R value may be used. In addition, a set of color component values (e.g., RGB values) may be used.

The object pixel value is generated by analyzing the pixel values in a block. Specifically, pixels in the block are subjected to clustering using information such as pixel values or positions, where the pixels are assigned to the clusters for the object number, and an average or median for the pixel values of the pixels included in each cluster is computed.

For each pixel in the relevant block, an object pixel value corresponding to the "object" of the pixel is assigned to the pixel, and is used for generating a predicted image of the block.

Object Map

The object map indicates which "object" is present at each pixel in a target block. Specifically, each pixel is represented using an object identifier associated with an "object" (i.e., object pixel value). The object map can be represented using a two-dimensional structure in most simple representation, and can also be represented using a tree structure. The object map is generated by assigning an object identifier to each pixel in the block, where the object identifier corresponds to an object pixel value that is most approximate to the pixel value of the pixel.

In addition to the similarity between the pixel value and the object pixel value, the number of bits required for representing the object map itself may also be considered to generate the object map. When generating a predicted image, the object map is used for indicating which object pixel value is assigned to each pixel in the block.

Additional Information

In the present invention, information used for predicting an image (or video) signal of a processing target frame is called "additional information", which is generated for each block to be processed. Basically, the additional information consists of three information items such as the object number, the object pixel value, and the object map.

Typically, image encoding of the present invention performs:

(1) to determine an object number that indicates the number of objects present in a processing region;
(2) to assume that objects corresponding to the object number are present in the processing region, and determine one pixel value, which is assigned to each individual object, to be an object pixel value;
(3) to associate each object pixel value with an object identifier for identifying the relevant object, and generate, based on each object pixel value and the pixel value of each pixel in the processing region, an object map that indicates which object has been obtained at each pixel in the processing region, by using the object identifier;
(4) to generate a predicted image for the processing region by assigning the object pixel value to each pixel in accordance with the object map;
(5) to encode the object map;
(6) to encode each object pixel value;
(7) to perform predictive encoding of an image signal for the processing region by using the predicted image; and
(8) to multiplex encoded data of the object map, encoded data of the object pixel value, and encoded data of the image signal, and output the multiplexed data.

As described above, in order to generate a predicted image in the present invention, two additional information items are used, which are the object pixel value that is a representative pixel value of each object and the object map that indicates, for each pixel, which object pixel value is used for generating the predicted image.

In comparison with conventional techniques which use "prediction direction" for generating a predicted image, although the present invention increases the amount of code required for the additional information, it substantially reduces the amount of code required for encoding the prediction residual, so that the total amount of code required for each processing region (e.g., block) can be reduced.

Additionally, in the above step (1) of determining the object number in the present invention, it is possible to estimate the number of objects in the processing region based on information about the pixels in the processing region, determine the estimated value to be the object number which is encoded, and to output multiplexed data (as the additional information) of the encoded data of the object number and the other encoded data.

Accordingly, an optimum object number is set for each processing region so as to improve the prediction accuracy.

In addition, in the above step (6) of encoding the object pixel value in the present invention, it is possible to determine for each object identifier whether or not the object identifier is used in the relevant object map, to encode the object pixel value corresponding to the object identifier if it is used, and to omit the encoding of the object pixel value corresponding to the object identifier if it is not used.

The amount of code can be further reduced by omitting the encoding of the object pixel value which is not used for prediction for the pixels in the processing region.

Furthermore, in the above step (7) of performing predictive encoding of the relevant image signal, it is possible to subject the predicted image to dithering, and to perform the predictive encoding of the image signal for the processing region in the encoding target by using the predicted image subjected to the dithering.

When subjecting the predicted image to dithering, a variation more similar to a natural image can be produced even if the number of objects is limited.

Typically, image decoding of the present invention performs:

(1) to determine an object number that indicates the number of objects present in a processing region;
(2) to decode an object map from encoded data which is a decoding target;
(3) to decode, from the encoded data, an object pixel value assigned to each individual object identifier;
(4) to generate a predicted image for the processing region by assigning the object pixel value to each pixel in accordance with the object map;

(5) to decode, from the encoded data, an image signal for the processing region by using the predicted image.

Accordingly, the image encoded by the above-described image encoding can be decoded.

In addition, in the above step (1) of determining the object number in the present invention, it may be determined due to decoding of the encoded data.

In the above step (3) of decoding the object pixel value in the present invention, only the object pixel value corresponding to each object identifier which appears in the object map may be decoded.

In the above step (5) of decoding the image signal in the present invention, it is possible to subject the predicted image to dithering, and to decode the image signal for the processing region from the encoded data by using the predicted image subjected to the dithering.

Effect of the Invention

In accordance with the present invention, for an image (e.g., distance image) that has pixel values considerably depending on objects, and locally has a limited number of objects, it is possible to perform accurate prediction by using a representative pixel value and object identification information assigned to each object, thereby implementing efficient image encoding.

Therefore, an accurate predicted image securing accurate edges can be produced for an object having a complex shape, thereby reducing the amount of code required for encoding the relevant prediction residual.

BRIEF DESCRIPTION OF THE DRAWINGS

FIG. 4 is a diagram showing an example of the object map.

FIG. 5 is a diagram for explaining an example of encoding of the object identifier.

FIG. 14 is a diagram showing another example of the decoded object map.

FIG. 15 is a flowchart showing an example of syntax applied to encoded data of each block.

MODE FOR CARRYING OUT THE INVENTION

In the present invention, one pixel value is assigned to each object defined in a processing region, and information for identifying the object is assigned to each pixel in the processing region, so as to generate a predicted signal. Therefore, it is possible to generate a highly accurate predicted image corresponding to any object shape. In particular, when there are very different pixel values depending on respective objects, it is possible that an object to be referred to coincides with an object to be predicted, thereby almost equalizing the prediction accuracy between the pixels.

In addition, even when there are lots of pixel values over the entire image, only a limited number of pixel values should be present in each local region. Therefore, a pixel value as an object is assigned to each small region, so that the present invention can perform efficient encoding by using local characteristics of the object.

Below, embodiments of the present invention will be explained with reference to the drawings.

First Embodiment: Image Encoding Apparatus

A first embodiment will be explained first.

Figure 1:
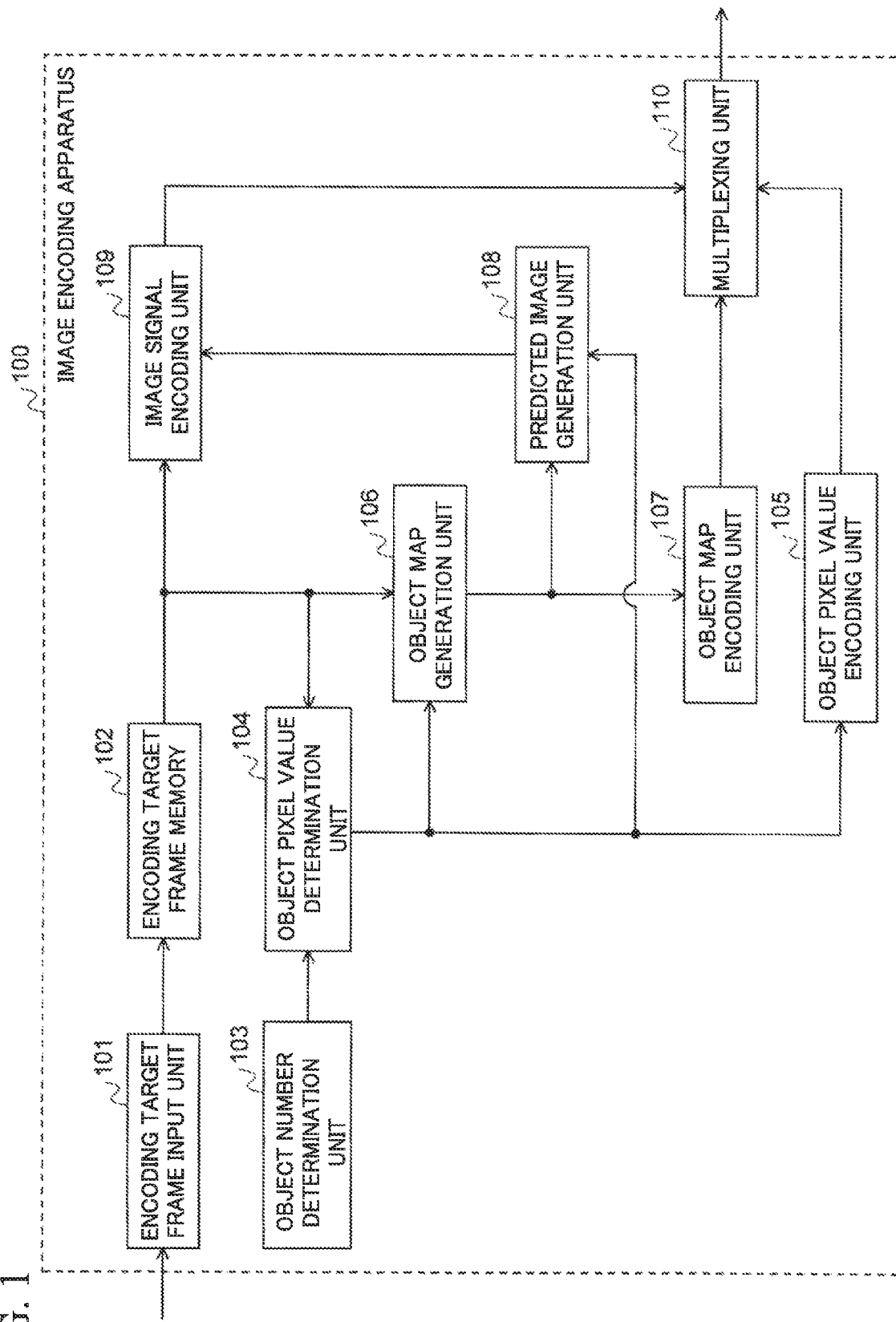
FIG. 1 is a block diagram showing the structure of an image encoding apparatus as the first embodiment of the present invention.

FIG. 1 is a block diagram showing the structure of an image encoding apparatus as the first embodiment of the present invention.

As shown in FIG. 1, an image encoding apparatus 100 has an encoding target frame input unit 101, an encoding target frame memory 102, an object number determination unit 103, an object pixel value determination unit 104, an object pixel value encoding unit 105, an object map generation unit 106, an object map encoding unit 107, a predicted image generation unit 108, an image signal encoding unit 109, and a multiplexing unit 110.

The encoding target frame input unit 101 receives an image frame as an encoding target.

The encoding target frame memory 102 stores the received encoding target frame.

The object number determination unit 103 determines the object number for objects included in a processing region having a predetermined size.

The object pixel value determination unit 104 assumes that a specified number of objects are present in the processing region, and determines one pixel value assigned to each object.

The object pixel value encoding unit 105 encodes the pixel value assigned to each object. Below, the pixel value assigned to each object generated in a specific region is called an "object pixel value".

The object map generation unit 106 identifies the object obtained at each pixel in the processing region, thereby generating an object map explained later.

The object map encoding unit 107 encodes the generated object map.

The predicted image generation unit 108 generates a predicted image for the processing region, based on each object pixel value and the object map which were generated for the processing region.

The image signal encoding unit 109 encodes, for each processing region, an image signal of the encoding target frame by using the predicted image.

The multiplexing unit 110 multiplexes encoded data of the object pixel value, encoded data of the object map, and encoded data of the image signal of the encoding target frame, and outputs the multiplexed data.

Figure 2:
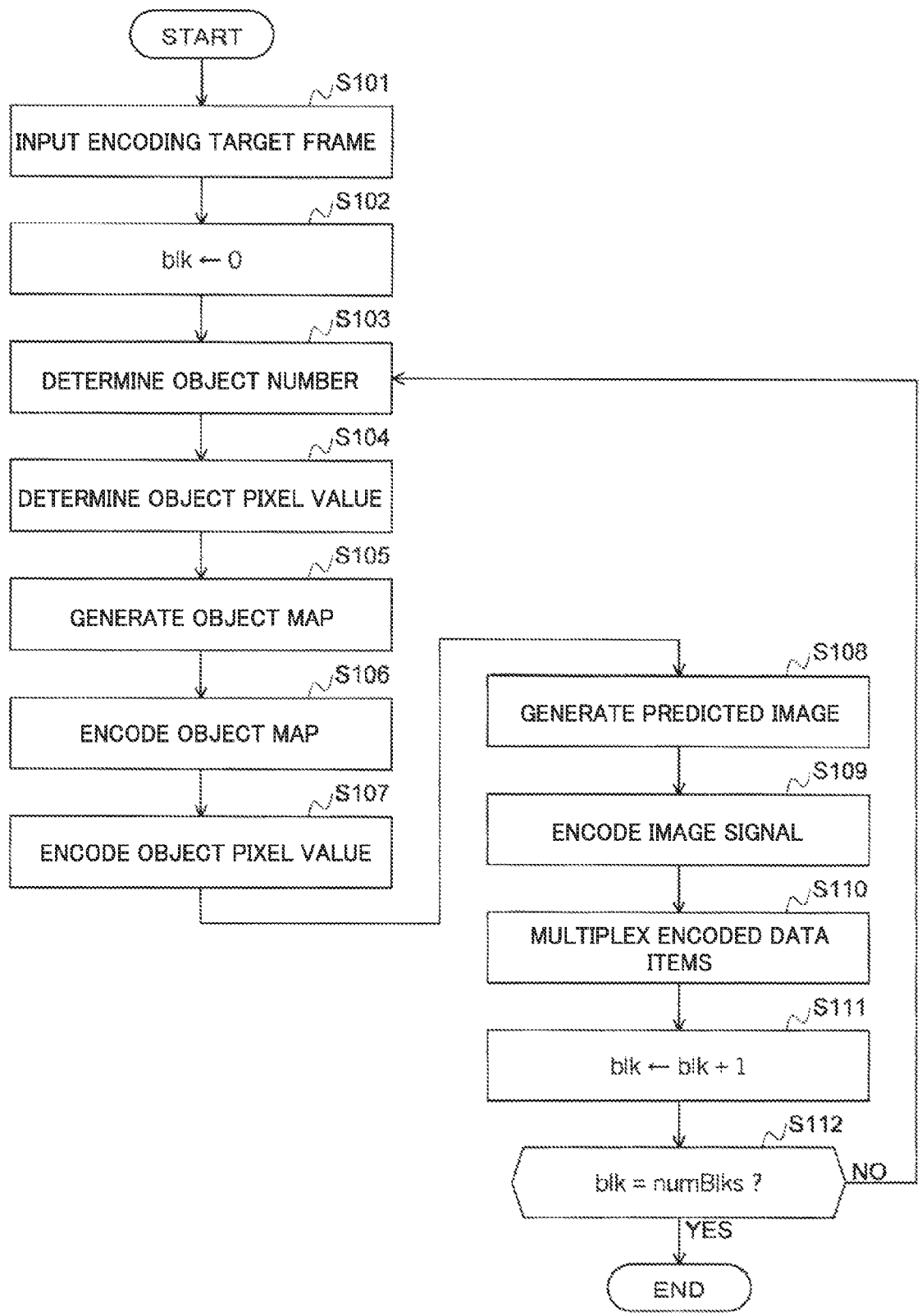
FIG. 2 is a flowchart explaining the operation of the image encoding apparatus in the first embodiment.

FIG. 2 is a flowchart explaining the operation of the image encoding apparatus 100 in the first embodiment. According to the flowchart, the operation executed by the image encoding apparatus 100 will be explained in detail.

First, the encoding target frame input unit 101 receives an encoding target frame, which is stored in the encoding target frame memory 102 (see step S101).

After the encoding target frame is stored, it is divided into regions, and the image signal of the encoding target frame for each divided region is encoded (see steps S102 to S112).

More specifically, given "blk" for an encoding target block index and "numBlks" for the total number of encoding target blocks, blk is initialized to be 0 (see step S102), and then the following process (from step S103 to step S110) is repeated adding 1 to blk each time (see step S111) until blk reaches numBlks (see step S112).

In the process repeated for each encoding target block, first, the object number determination unit 103 determines the number of objects (object number "numObjs") included in block blk (see step S103).

The object number may be determined using any operation that must be the same as the corresponding operation executed on the decoding side. For example, a predetermined number may always be employed.

In addition, different object numbers may be assigned to respective encoding target blocks, which may be implemented by determining each object number in accordance with the pixel values of each encoding target block.

More specifically, the pixels in the encoding target block are subjected to clustering using, for example, a K-means method or Affinity Propagation, so that the minimum number of clusters, in each of which variance for the pixel values is smaller than or equal to a predetermined value, is determined to be the object number. The criterion for the clustering may be only the pixel value, or may be both the pixel value and the pixel position.

In another method, for each candidate of the object number, a rate-distortion cost is computed, which is obtained by the weighted sum of the amount of code and the amount of distortion which are evaluated for the encoding using the object number, where the object number which produces the minimum cost is employed.

Since the encoding efficiency may be degraded according to an increase in the object number, the maximum number thereof may be predetermined so as to prevent the object number from being a fixed value or more.

Here, the object number is used when decoding encoded data. Therefore, if different object numbers are assigned to respective encoding target blocks, the determined object numbers must be included in the encoded data.

Figure 3:
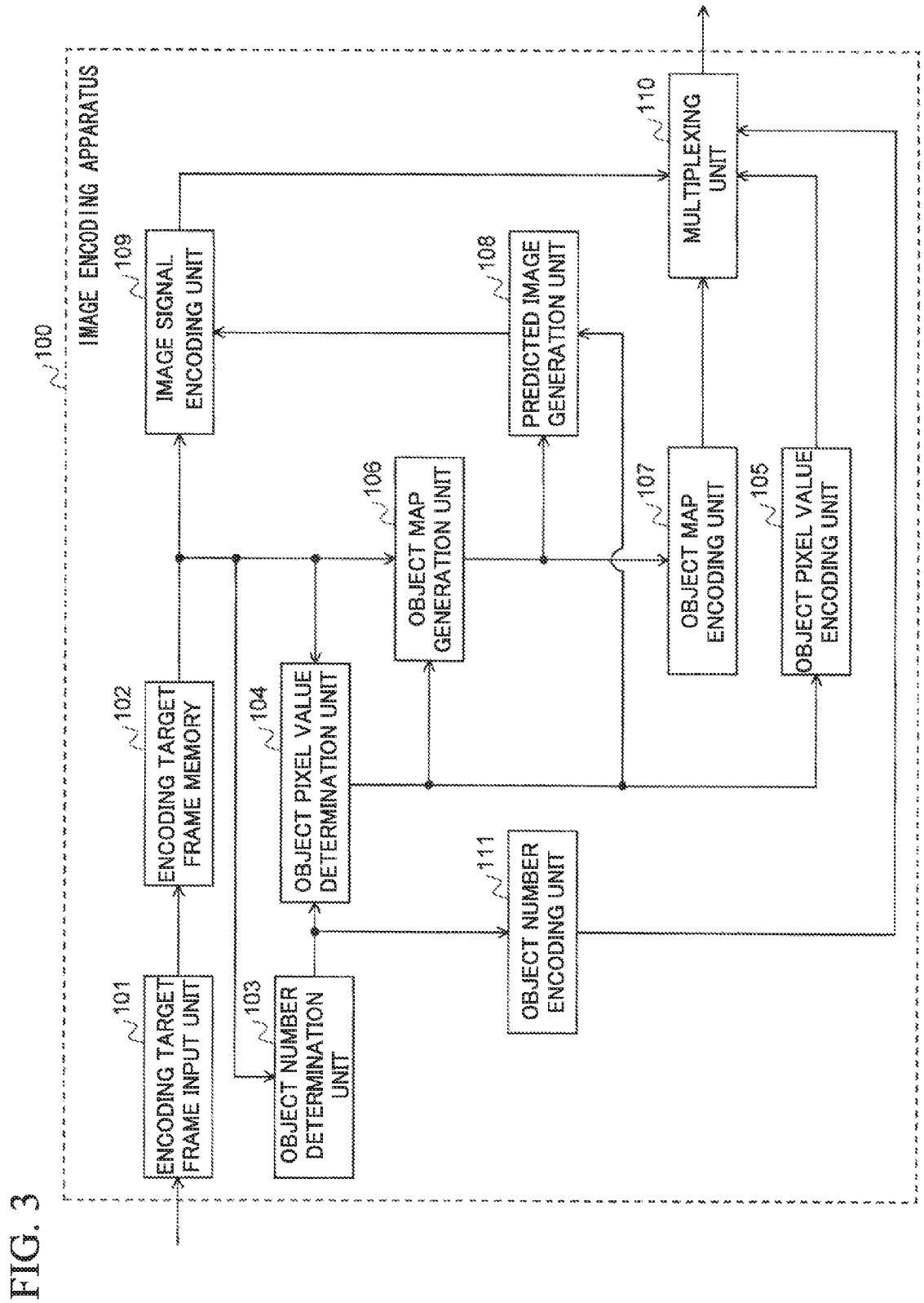
FIG. 3 is a block diagram showing the structure of another image encoding apparatus relating to the first embodiment.

FIG. 3 is a block diagram for the image encoding apparatus employed when encoding of the object number is performed.

In order to encode the object number, an object number encoding unit 111 that encodes the object number determined by the object number determination unit 103 of the image encoding apparatus 100 in FIG. 1 is provided after the position of the object number determination unit 103.

When encoding the object number, the determined object number may be directly encoded, or a differential value between the object number and a predicted value thereof, which is predicted using information about previously-encoded regions adjacent to the encoding target block, may be encoded.

In an example method of such prediction, an average or median of object numbers used when encoding previously-encoded neighbor (or neighboring) blocks may be determined as the predicted value.

Additionally, encoding of the object number may not be performed for each block, but the object number may be determined and encoded for each set of blocks, that is called a "frame" or "slice". In this case, when the object number varies between regions, it is possible to efficiently encode the object number.

Such object number determination and encoding applied to each frame or slice may be combined with the object number determination and encoding for each block.

In this case, for the processing unit of frame or slice, an object number which is believed to suit lots of blocks included in the relevant frame or slice is employed and encoded, and for each block, a variation from the object number is determined and encoded. The variation determined and encoded for each block may be predicted using information about a previously-encoded region, and a prediction residual for the variation may be encoded.

After the determination of the object number is completed, the object pixel value determination unit 104 assigns one pixel value "Value (i)" to each object in block blk (see step S104).

The above "i" is an object identifier used for identifying each object, and is an integer that is greater than or equal to 0, and smaller than numObjs. In addition, the object identifier is allocated in accordance with a predetermined criterion. Here, the object identifier is sequentially allocated from the smallest to the largest of the object pixel value.

In order to assign one pixel value to each object, any method can be used. For example, the range for the pixel value is equally divided into sections, the number of which coincides with the object number (e.g., a pixel value range of "0 to 255" is divided into four sections such as "0 to 63", "64 to 127", "128 to 191" and "192 to 255", where the object number is 4), and a median of each range may be employed as the object pixel value.

In another method, pixels of block blk are grouped into clusters, the number of which is numObjs by means of clustering as described above, and an average or median of the pixel values of pixels included in each cluster may be determined to be the object pixel value.

If the pixels of block blk are subjected to clustering when determining the object number, the object pixel value may be determined together with the determination of the object number.

In another method of determining the object pixel value, the pixels are grouped into clusters, the number of which is numObjs or smaller and is the minimum value when satisfying a condition that the maximum value of the variance for pixel values in each cluster is smaller than a specific threshold. In this case, an average or median of the pixel values in each cluster may be determined to be the object pixel value, and a moderate object pixel value is applied to each of objects, the number of which is the difference between numObjs and the number of clusters.

A constant object number may always be used. However, even if a single object is originally present, an assumption that a plurality of objects are present is employed, which provides excessively highly accurate prediction, so that the amount of code required for the object map (an object identifier is assigned to each pixel in block blk) is increased.

However, it is possible to prevent the amount of code from excessively increasing by applying a threshold to a target bitrate so as to determine the object identifier independent of numObjs.

For example, if the target bitrate is (i) smaller than threshold A, then it is set that only one object identifier appears in the object map regardless of the determined object number, or (ii) larger than threshold A and smaller than threshold B, then it is set that one or two object identifiers appear in the object map. Therefore, generation of the object map can be controlled.

Such a condition may not be employed. However, in this case, if a relatively lager object number (e.g., 10) is determined, the amount of code required for the object map may be too large when an operation explained later is directly applied to the generation of the object map.

After the object pixel value is determined, an object map for block blk is generated by the object map generation unit 106 (see step S105).

The object map may be two-dimensional information as shown in FIG. 4.

In order to assign an object identifier to each pixel, an object identifier having an object pixel value most approximate to the pixel value of the pixel may be employed.

In another method, if clustering was performed for determining the object pixel value, the result of clustering is used so that an object identifier assigned to each cluster is applied to the pixels belonging to the cluster.

In another method, a plurality of candidates for the object map are generated, and for each candidate, a rate-distortion cost is computed, which is obtained by the weighted sum of the amount of code and the amount of distortion which are evaluated for the encoding using the object map, where the object map which produces the minimum cost is employed.

All possible object maps may be set as such candidates, or only a limited number thereof may be set as the candidates.

Distinctive object maps may include an object map generated by assigning to each pixel, an object identifier that has an object pixel value most approximate to the pixel value of the pixel; an object map, all pixels of which have the same object identifier; and an object identifier that is horizontally or vertically divided into two sections.

Next, the generated object map is encoded by the object map encoding unit 107 (see step S106).

The encoding may be performed by any method. For example, a fixed or variable length code is assigned to each object identifier according to the object number, and the two-dimensional map information is converted into one-dimensional binary data by means of raster or zigzag scanning, so as to perform the encoding.

In another method of encoding the object identifier assigned to each pixel in block blk while scanning the pixels in a predetermined order, previously-encoded pixels around each pixel are determined to be reference pixels so as to perform arithmetic encoding together with switching a probability table in accordance with the object identifiers of the reference pixels.

For example, when the object number is 3, three reference pixels are defined for the encoding target pixel (see "x" in FIG. 5). In this case, for each combination between the object identifiers of the reference pixels, a probability table for the object identifier of the encoding target pixel can be defined.

That is, in the above case, 27 different probability tables are used for the relevant encoding. Although the same probability tables must be used on the decoding side, they may be fixed or variable. If being variable, the probability table is updated according to an encoding history.

Generally, a single object appears continuously. Therefore, it is possible to more accurately represent occurrence probability of an encoding target symbol by using peripheral circumstances (for peripheral pixels) as shown above, and thus to improve the encoding efficiency for arithmetic coding.

Additionally, it is possible to further accurately predict the occurrence probability by using information about peripheral pixels in a further wider region.

Depending on the method of defining the reference pixels, part of the reference pixels may be absent at an edge of the relevant picture, or no object identifiers may be assigned to the reference pixels when one of switchable prediction modes is applied to each block (as performed in H.264/AVC).

For such pixels, predetermined object identifiers may be assigned to them, or another probability table may be defined by assigning "unknown" labels to them, thereby also improving the encoding efficiency of arithmetic coding for the object map in consideration of the above-described case.

In another method, the object map is converted into tree-structure information prior to the encoding. In a specific tree structure, block blk corresponds to a root, and a plurality of sub-blocks, which are obtained by dividing the block of the parent node (i.e., root), are assigned to each child node. According to such a tree structure, it is possible to efficiently represent a set of pixels (which are present together) of a single object, thereby improving the encoding efficiency.

Any tree structure may be defined.

For example, binary information that indicates whether or not the object identifiers of all pixels in a block corresponding to each node are the same is applied to the node. As each child node, (i) if the above object identifiers are the same, a leaf having the number of the relevant object identifier is defined, or (ii) if the above object identifiers are not the same, the relevant block is divided into four sub-blocks and four nodes corresponding thereto are defined. Accordingly, tree-structure information can be generated.

When a target block has only one pixel, the node that indicates whether or not the object identifiers of all pixels are the same can be omitted.

Figure 6:
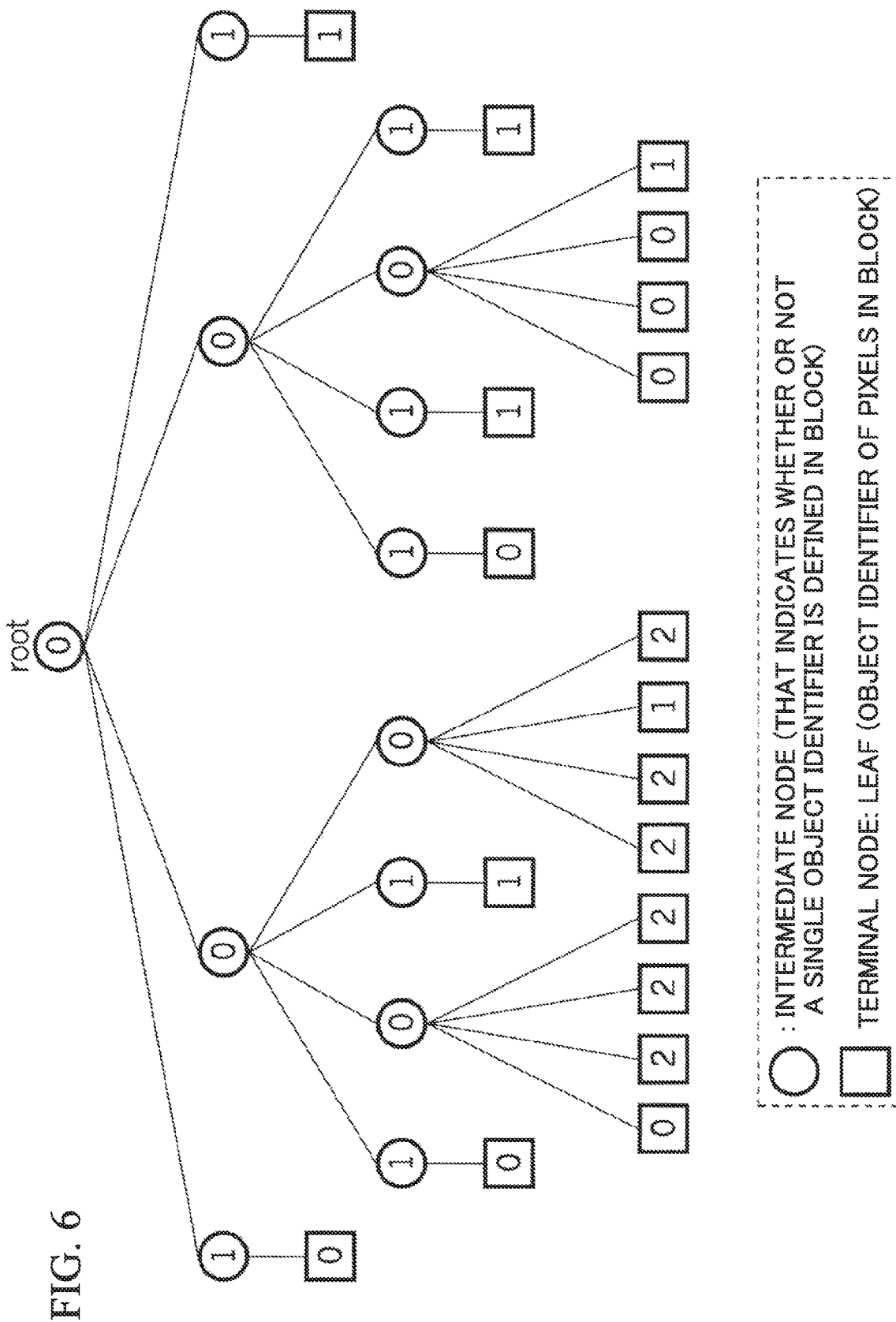
FIG. 6 is a diagram showing an example of the tree-structure object map.

FIG. 6 shows a tree structure generated for the object map of FIG. 4 by using the above-described method.

In FIG. 6, to each node, binary information "1" is applied if the object identifiers of all pixels in the block corresponding to the node are the same, otherwise binary information "0" is applied.

In another definition, to each node, (i) if the object identifiers of all pixels in the block corresponding to the node are the same, a number obtained by adding 1 to the relevant object identifier is applied, or (ii) otherwise binary information "0" is applied, where for only nodes to which 0 is applied, child nodes corresponding to four sub-blocks obtained by dividing the relevant block are defined.

Figure 7:
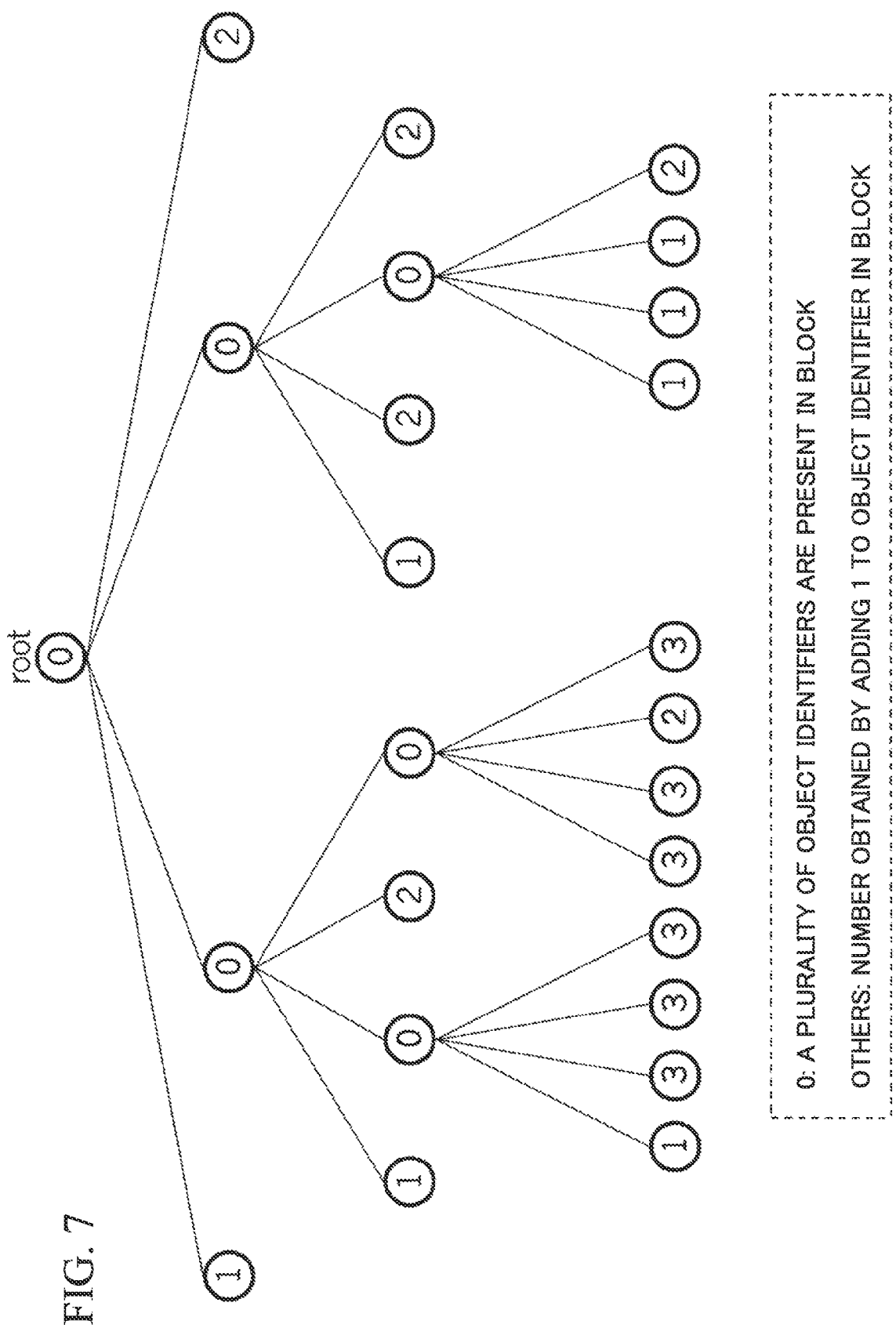
FIG. 7 is a diagram showing another example of the free-structure object map.

FIG. 7 shows a tree structure generated for the object map in FIG. 4 by using the above method.

In the encoding of the generated tree, the tree is scanned using depth-first search or width-first search, and information about each node is encoded in the scanning order. The depth-first search is a search that starts from the root node of the tree (i.e., target for search), extends deeply until a target node or a nod having no child is found, and then returns to a node (nearest to the node at the end of the current search) that has not yet been subjected to the search.

In contrast, the width-first search has a rule such as "in order of depth from the smallest (i.e., from a point to which a small number of nodes to be visited from the top are present)" or "in sequential order from the node on the left side".

Additionally, it is possible to separately encode leaf nodes and the other nodes.

A numerical sequence obtained by scanning the tree in FIG. 6 by means of the depth-first search is "010010002221102212010110000111111".

When separating the leaf nodes from the other nodes, the leaf nodes produce "00022212212010000111", and the other nodes produce "0101010011011".

In addition, a numerical sequence obtained by scanning the tree in FIG. 7 by means of the depth-first search is "010101333203323012011111222".

Such a numerical sequence may be directly binarized to generate encoded data, or may be subjected to arithmetic encoding while switching the probability table in accordance with the state of object identifiers of neighbor pixels.

For example, in order to encode nodes other than the leaf nodes of FIG. 6, the object identifiers of pixels adjacent to a block corresponding to each node may be examined, and the probability table may be switched in accordance with the number of pixels corresponding to an object identifier that has the maximum number of pixels.

In order to encode the leaf nodes of FIG. 6, the probability table may be switched in accordance with the state of identifiers of pixels adjacent to a block corresponding to each node.

Although the same probability table must be used by the encoding and the decoding sides, they may be fixed or variable. If they are variable, the probability table may be updated according to an encoding history.

After the encoding of the object map is completed, the object pixel value for each object identifier is encoded by the object pixel value encoding unit 105 (see step S107).

The object pixel value may be directly encoded, or prediction using object pixel values in a neighbor block or previously-encoded object pixel values in the same block (i.e., the present block) may be performed so as to encode only a prediction residual.

In order to perform the prediction based on a neighbor block, an average or median of the object pixel values in a neighbor block which has the same (target) object identifier may be determined to be a predicted value.

In order to perform the prediction using previously-encoded object pixel values in the same (target) block, if the encoding is performed in the order of object pixel value from the smallest to the largest, a value obtained by adding 1 to an object pixel value encoded immediately before the present encoding may be determined to be a predicted value, or a predicted value may be generated using such an object pixel value encoded immediately before and the number of remaining object pixel values which should be encoded.

In the last method described above, a range defined from the minimum value, that is obtained by adding 1 to an object pixel value encoded immediately before, to the maximum value, that is the maximum value among possible pixel values, is divided into partial ranges, the number of which coincides with the number of remaining object pixel values which should be encoded, where the partial ranges have the same size, and a median in a partial range which includes the minimum value is determined to be a predicted value.

For example, when 51 is an object pixel value encoded immediately before and the number of remaining object pixel values is 3, a range [52, 255] is divided into three partial ranges [52, 119], [120, 187], and [188, 255] which have the same size, and a median "85" in the range [52, 119] which includes the minimum value is determined to be a predicted value.

If partial ranges having just the same size cannot be obtained, partial ranges defined between integers may be generated in accordance with a predetermined rule, or partial ranges may be represented decimally. Here, since the predicted value should be an integer, a median is computed by performing a rounding-down or rounding-off operation.

In addition, the relevant range may be divided using a specific rule (other than division at regular intervals) based on previous knowledge. For example, a division method for producing partial ranges whose sizes increase such as "N, 2N, 3N, . . . " or decrease such as "N, N/2, N/3, . . . " may be employed.

Additionally, the prediction may be performed by combining the prediction method based on a neighbor block with the prediction method using previously-encoded object pixel values in the same block (i.e., the present block).

For example, the first object pixel value is predicted based on a neighbor block, and all other object pixel values are each predicted using an object pixel value encoded immediately before in the same block.

In another method, an object pixel value encoded immediately before in the same block is compared with a value predicted using a neighbor block, and a predicted value is determined according to a result of the comparison.

In another method, information that indicates which prediction method was used is encoded separately so as to switch the prediction method.

Figure 8:
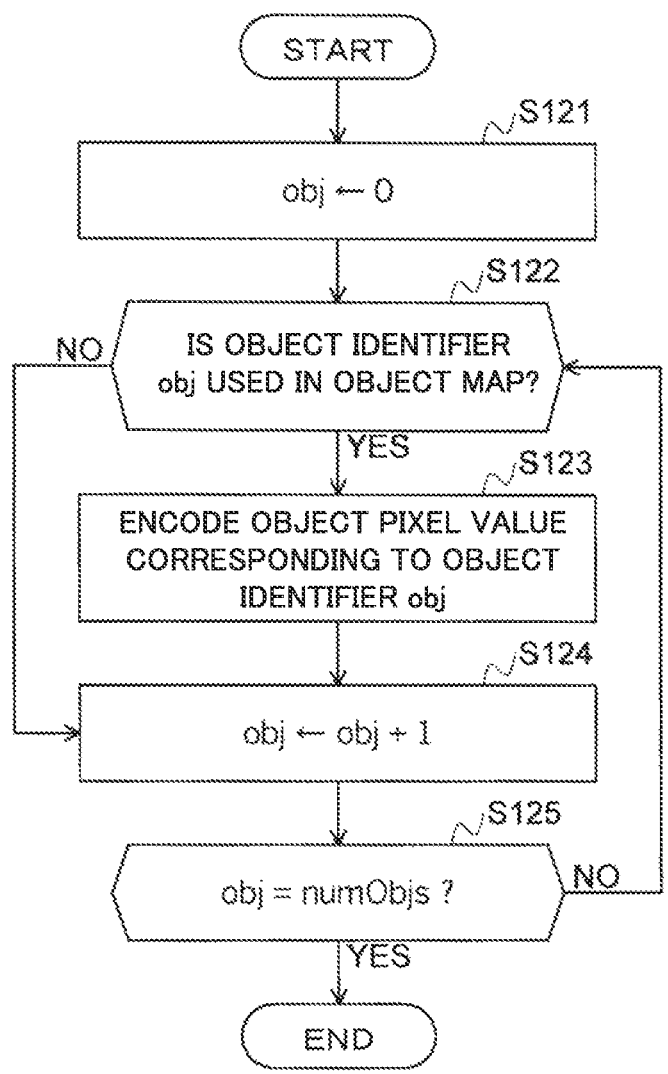
FIG. 8 is a flowchart showing an operation of encoding only object pixel values corresponding to the object identifiers that appear in the object map.

In the encoding of the object pixel value, only the object pixel value corresponding to each object identifier that appears in the object map may be encoded. A detailed operation flow therefor is shown in FIG. 8.

In this flow, the object identifier (obj) is initialized to 0 (see step S121), and for each object identifier, it is determined whether or not the object identifier is used in the relevant object map (see step S122).

If it is used, the object pixel value corresponding to the object identifier is encoded (see step S123), and the next object identifier is examined (see step S124). Otherwise (if it is not used), the relevant encoding is not performed, and the next object identifier is immediately examined (see step S124).

The above-described operation is repeated so as to process all object identifiers, and then the operation is terminated (see step S125).

Figure 9:
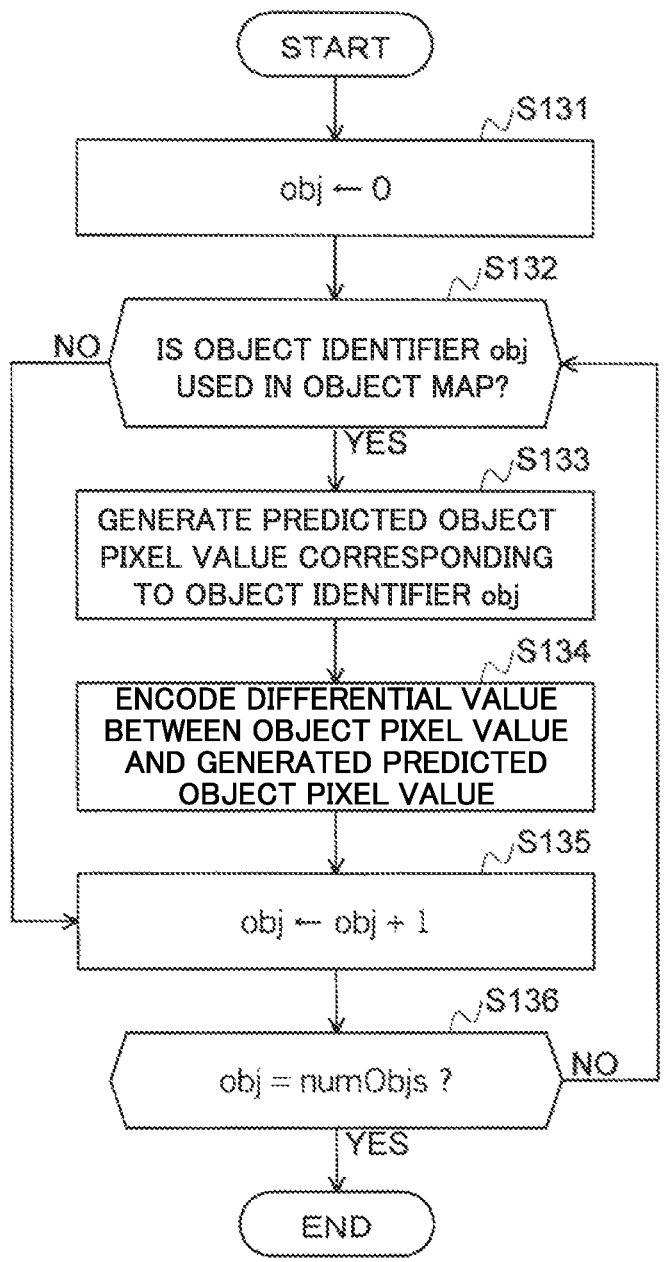
FIG. 9 is a flowchart showing an operation of encoding object pixel values by performing prediction thereof.

FIG. 9 is a flowchart for an operation that includes prediction of the object pixel value.

In comparison with FIG. 8, when the target object identifier is used in the object map, a predicted value for the object pixel value corresponding to the object identifier is generated (see step S133), and a differential value between the predicted value and the object pixel value is encoded (see step S134).

Any method can be used for determining whether or not an object identifier is used in the relevant object map.

For example, when generating or encoding an object map, a flag that indicates whether or not each object identifier has been used is generated before starting the operation flow of FIG. 8 or 9. When determining whether or not each object identifier is used, the flag is referred to.

Owing to such a determination about the object map so as to control the encoding of the object pixel value, it is possible to reduce the amount of code required for encoding information which is not used.

For example, if always setting a fixed object number regardless of the image signal of block blk, an object identifier which is not used is generated depending on the method of determining the object pixel value or the method of generating the object map. The amount of code can be reduced by omitting the encoding of the object pixel value corresponding to such an object identifier that is not used.

In the above explanation, the object pixel value or a prediction residual therefor is directly encoded. However, a quantized value computed therefor by using quantization parameters set for a target bitrate or quality may be encoded. In this case, when generating a predicted value, a value decoded by a sequence of the quantization and inverse quantization should be referred to.

Next, a predicted image for block blk is generated by the predicted image generation unit 108 by using the object map and each object pixel value (see step S108).

Specifically, the predicted image is generated by assigning the object pixel value, which corresponds to each object identifier obtained by the object map, to each pixel. If the object pixel value has been encoded through the quantization, the predicted image should be generated using a value obtained by a sequence of the quantization, inverse quantization, and decoding The above-generated predicted image may be subjected to dithering.

A predicted image, which is generated using the object map and each object pixel value, has only pixel values the number of which coincides with the object number. Therefore, the predicted image may have characteristics which differ from natural images. Because of dithering (that combines existing pixel values so as to represent intermediate pixel values in the entire image), a variation that more approximates a natural image can be applied to the predicted image.

Although any method for performing dithering can be used, the same dithering effect should be produced on the decoding side. Therefore, if switching between a plurality of dithering methods should be performed or a parameter such as an initial value is required for dithering, information therefor should be encoded.

After obtaining the predicted image, an image signal for block blk is subjected to predictive encoding executed by the image signal encoding unit 109 (see step S109).

The encoding may be performed using any method. In generally known encoding such as MPEG-2 or H.264/AVC, a differential signal between the image signal and the predicted image of block blk is sequentially subjected to transformation such as DCT, quantization, binarization, and entropy encoding.

In the last step, the multiplexing unit 110 multiplexes encoded data of the object map, encoded data of each object pixel value, and encoded data of the image signal, and outputs the multiplexed data (see step S110). If the object number has been encoded, encoded data thereof is similarly processed.

Although the multiplexing is performed for each block, it may be performed for each frame. In this case, decoding on the decoding side should be executed after buffering one frame of encoded data.

As an unusual case, when the object number is 1, only one kind of object map is present. Accordingly, the object map setting step should determine that one and only object map candidate, and no encoding for the object map is necessary.

Second Embodiment: Image Decoding Apparatus

Next, a second embodiment of the present invention will be explained.

Figure 10:
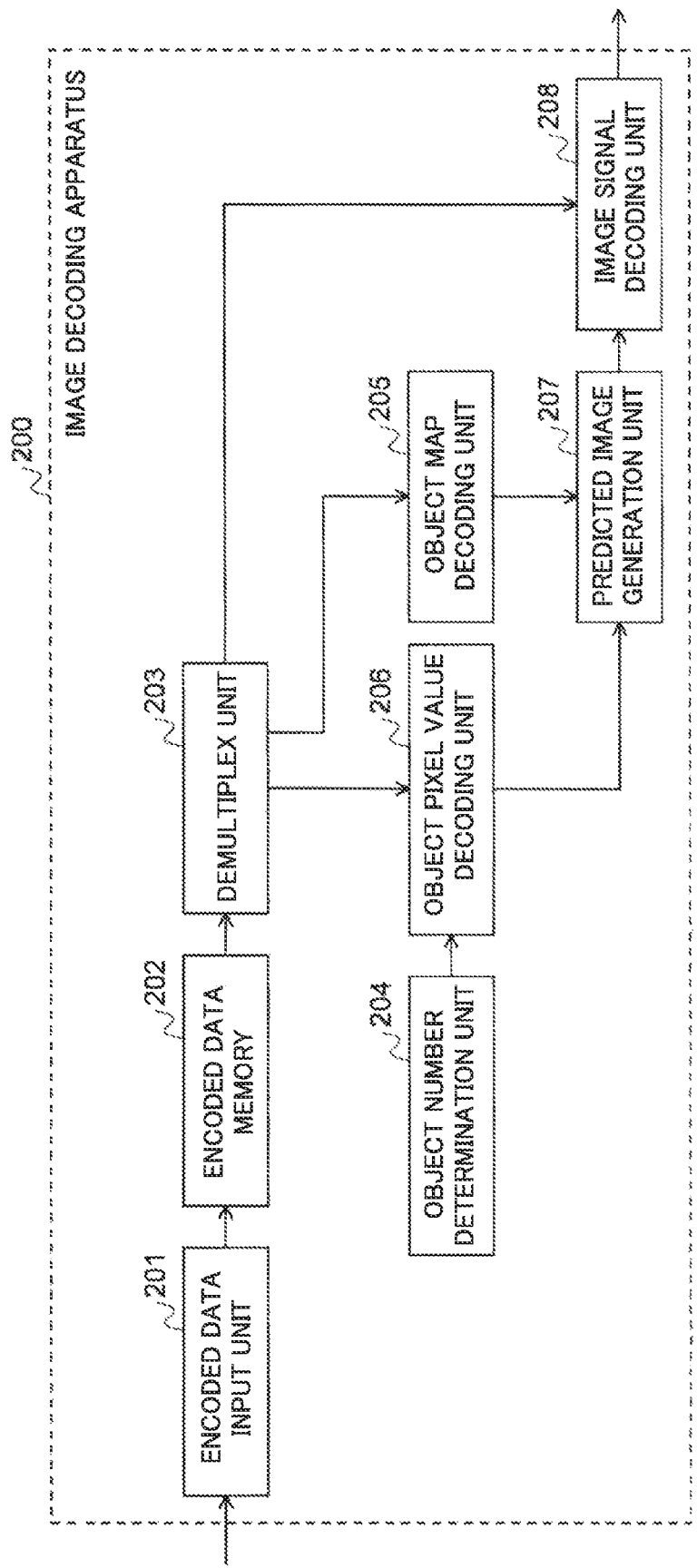
FIG. 10 is a block diagram showing the structure of an image decoding apparatus as the second embodiment of the present invention.

FIG. 10 is a block diagram showing the structure of an image decoding apparatus as the second embodiment of the present invention.

As shown in FIG. 10, an image decoding apparatus 200 has an encoded data input unit 201, an encoded data memory 202, a demultiplex unit 203, an object number determination unit 204, an object map decoding unit 205, an object pixel value decoding unit 206, a predicted image generation unit 207, and an image signal decoding unit 208.

The encoded data input unit 201 receives encoded data of an image frame as the decoding target.

The encoded data memory 202 stores the received encoded data.

The demultiplex unit 203 separates multiplexed encoded data into a plurality of encoded data items having different information items.

The object number determination unit 204 determines the object number for objects included in a processing region having a predetermined size.

The object map decoding unit 205 decodes an object map from the encoded data.

The object pixel value decoding unit 206 decodes an object pixel value for each object, from the encoded data.

The predicted image generation unit 207 generates a predicted image for the processing region, based on each object pixel value and the object map which were decoded for the processing region.

The image signal decoding unit 208 decodes the image signal of the decoding target frame from the encoded data, by using the predicted image for each processing region.

Figure 11:
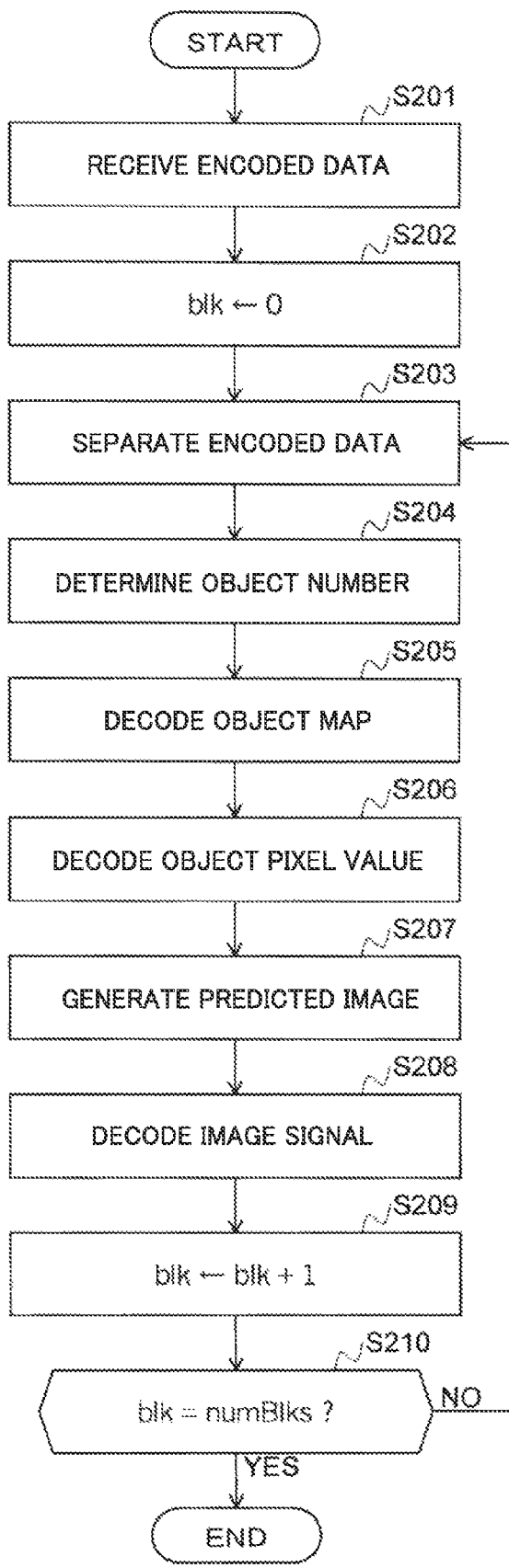
FIG. 11 is a flowchart explaining the operation of the image decoding apparatus in the second embodiment.

FIG. 11 is a flowchart explaining the operation of the image decoding apparatus 200 in the second embodiment. According to the flowchart, the operation executed by the image decoding apparatus 200 will be explained in detail.

First, the encoded data input unit 201 receives encoded data of the decoding target frame, and stores it into the encoded data memory 202 (see step S201).

After completing the storage of the encoded data, the decoding target frame is divided into regions, and the image signal of the decoding target frame is decoded for each divided area (see steps S202 to S210).

More specifically, given "blk" for a decoding target block index and "numBlks" for the total number of decoding target blocks, blk is initialized to be 0 (see step S202), and then the following process (from step S203 to step S208) is iterated while adding 1 to blk (see step S209) until blk reaches numBlks (see step S210).

In the process iterated for each decoding target block, first, the demultiplex unit 203 separates the received encoded data into encoded data items corresponding to a plurality of information items (see step S203).

In the second embodiment, encoded data items of the information items are interleaved for each block, that is, they are sequentially stored for each block. If such interleaving is performed for another processing unit such as a frame, it is unnecessary to iterate the above separation of encoded data for each block.

After completing the separation of encoded data, the object number determination unit 204 determines the number of objects (object number "numObjs") included in block blk (see step S204).

The object number determination is performed through the same operation as that performed on the encoding side. For example, if a predetermined number is determined on the encoding side, the same number is determined here.

In another example, in order to assign respective object numbers to different blocks, if an encoded object number is included in the encoded data, the object number determination unit 204 receives encoded data of the object number, and determines a decoded result (value) to be the object number.

The object number may not be determined. Even in this case, the target image can be decoded with no problem by decoding an object map and then decoding an object pixel value for each object identifier that appears in the object map, as explained below.

When determining the object number, the maximum value thereof is known. Therefore, it is possible to decode (i.e., represent) the object map with a smaller amount of code.

Figure 12:
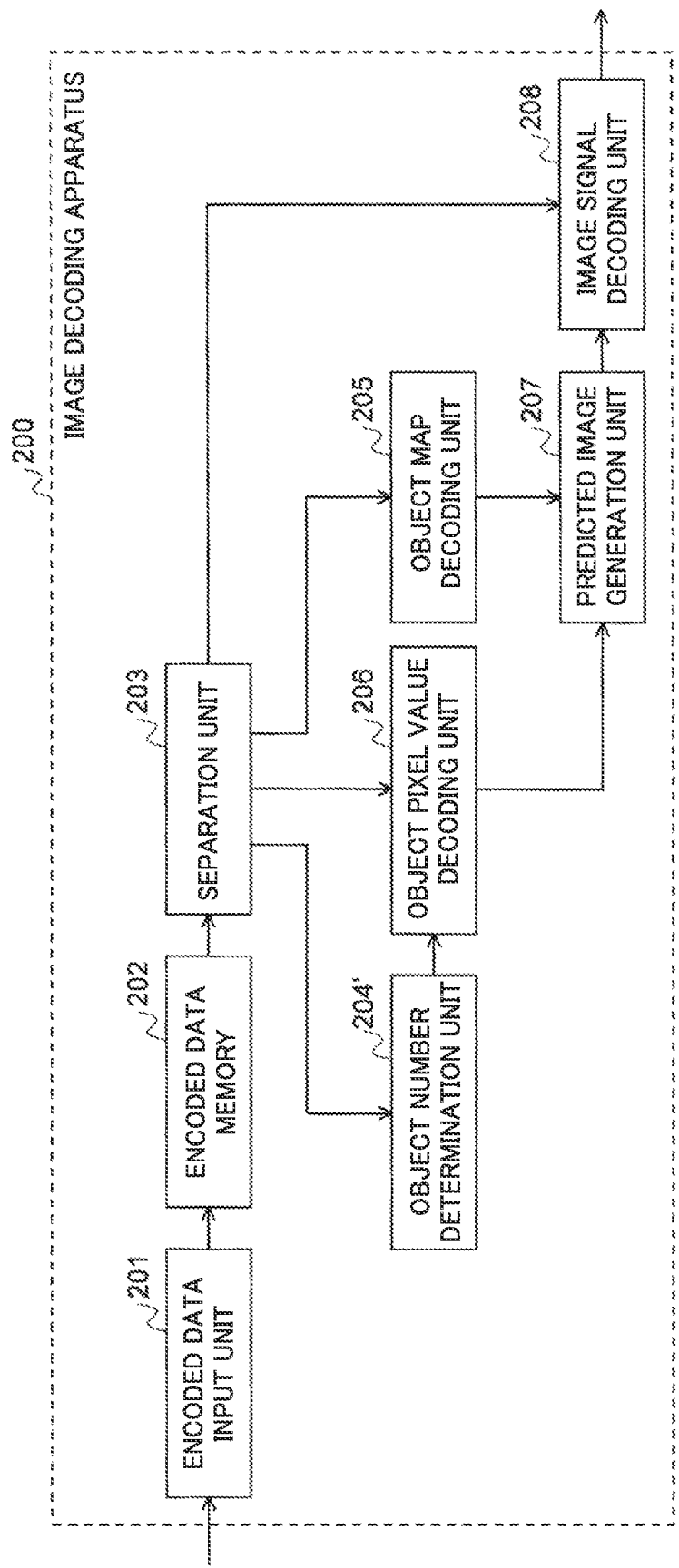
FIG. 12 is a block diagram showing the structure of another image decoding apparatus relating to the second embodiment.

FIG. 12 is a block diagram for the image decoding apparatus employed when the object number has been encoded.

As shown in FIG. 12, when the object number has been encoded, the object number determination unit 204' receives encoded data of the object number, which was obtained by the separation of the demultiplex unit 203, and decodes the data so as to obtain the object number.

If the encoding side performed predictive encoding of the object number of block blk by using a predicted value that is an average or median of object numbers used when encoding previously-processed blocks adjacent to the block blk, then a predicted value is generated by a similar method, and a value obtained by adding a value decoded from the encoded data to the predicted value is determined to be the object number.

Additionally, the object number may have been encoded not for each block, but for each set of blocks, that is called a "frame" or "slice". In this case, encoded data of the object number is once decoded for a target frame or slice, and the decoded result is temporarily stored so as to repeatedly determine the same value until the next updating timing.

In addition, in addition that a global object number for each frame or slice is encoded, a variation from the global object number for each block may be encoded. In this case, encoded data of the global object number is once decoded for a target frame or slice, and the decoded result is temporarily stored so as to obtain the object number for the present block by adding a variation (that is decoded for each block) to the stored value.

Furthermore, if the variation was predicted using a neighbor block, a differential value for the prediction of the object number is decoded for each block so as to obtain the object number for the present block by adding, to the decoded value, the global object number and a predicted value of the variation from the neighbor block.

After completing the determination of the object number, the object map decoding unit 205 decodes the object map from the demultiplexed encoded data (see step S205).

As described above, in the object map, an object identifier is assigned to each pixel of block blk. The object map may have two-dimensional information as shown in FIG. 4, and the decoding method of the object map depends on a method used in the encoding.

For example, a fixed or variable length code may be assigned to each object identifier according to the object number, and encoding may be performed by converting the two-dimensional map information into one-dimensional binary data by means of raster or zigzag scanning.

In this case, one-dimensional binary data as the encoded data is scanned sequentially, wherein every time when a relevant object identifier is found, the object identifier is assigned to the target pixel in the same order (e.g., raster or zigzag scanning) as that employed by the encoding side, so as to perform the decoding.

In another method of encoding the object identifier assigned to each pixel in block blk while scanning the pixels in a predetermined order, previously-encoded pixels around each pixel are determined to be reference pixels so as to perform arithmetic encoding together with switching a probability table in accordance with the object identifiers of the reference pixels.

In this case, for each pixel that appears in a scanning order similar to that employed in the encoding, previously-decoded neighbor pixels are determined to reference pixels, and arithmetic decoding is performed together with switching a probability table in accordance with the object identifiers of the reference pixels.

For the number of probability tables, the initial value of each table, and updating and setting methods of each table, the same methods as those employed in the encoding are used so as to perform accurate decoding.

Depending on the method of defining the reference pixels, part of the reference pixels may be absent at an edge of the relevant picture, or no object identifiers may be assigned to the reference pixels when one of switchable prediction modes is applied to each block (as performed in H.264/AVC).

Similar to the method employed by the encoding side, for such pixels, predetermined object identifiers may be assigned to them, or another probability table may be defined by assigning "unknown" labels to them, thereby accurately decoding encoded data of the object map which was efficiently encoded in consideration of the above-described case.

In another method, the object map may have been encoded using data of a tree structure (i.e., tree-structure data). Also in this case, the object map can be decoded from the encoded data, by using a method corresponding to the encoding method.

In an operation of decoding the object map from the provided encoded data by means of the tree-structure data, first, a numerical sequence that represents the tree-structure data is decoded from a binary sequence in the encoded data, by using a method that should correspond to a method employed on the encoding side.

For example, if arithmetic encoding using a variable probability table was performed, an uncompressed binary sequence is decoded from the encoded data while updating the probability table by using the same method as that employed in the encoding. Such an uncompressed binary sequence is subjected to inverse conversion by referring to a fixed or variable length table that is the same as the table used in the encoding, thereby decoding a numerical sequence before the encoding.

After the numerical sequence that represents the tree-structure data is decoded, the numerical sequence is interpreted so as to form the relevant data having a tree structure, where inverse conversion with respect to the conversion for generating a numerical sequence from the tree structure in the encoding should be performed.

Figure 13:
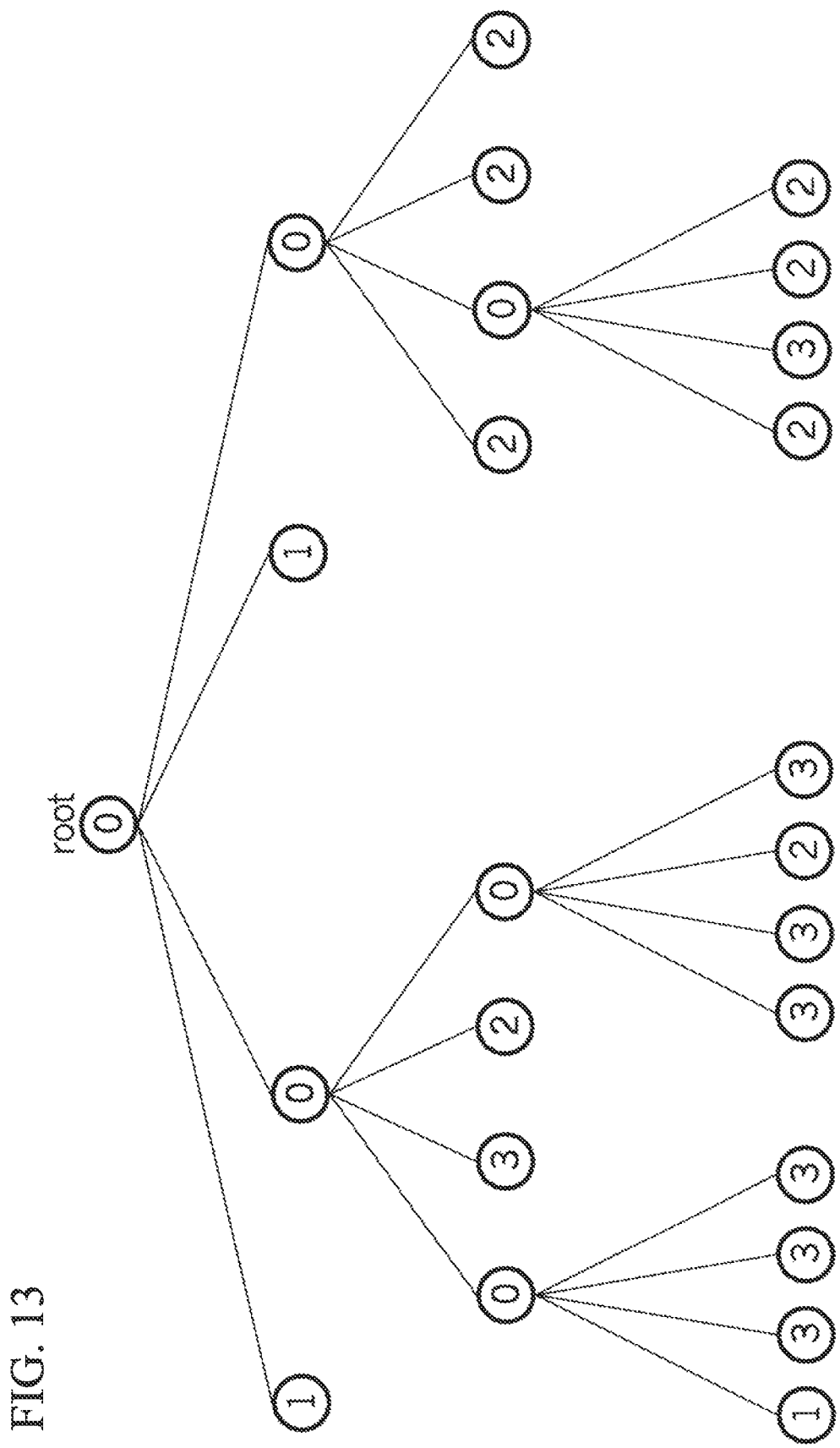
FIG. 13 is a diagram showing an example of the decoded tree-structure object map.

The definition of the tree structure should also be common between the encoding and decoding sides. In an example definition of the tree structure, block blk corresponds to a root, the respective nodes have numbers from 0 to numObjs, and each node to which "0" is assigned has four child nodes. When the numerical sequence was generated by means of scanning using the depth-first search, if a numerical sequence "01001333320332310202322222" is supplied, a tree as shown in FIG. 13 is restored.

After obtaining the tree-structure data, the object map is reconstructed based on the data. In this reconstruction process, the encoding and decoding sides have common definition of the tree structure, and the reconstruction process is executed using the definition.

In an example, the root of the tree represents the entire block blk, and each child node is associated with four sub-blocks (defined in the raster scanning order), which are obtained by dividing the parent node into two equal regions in both the horizontal and vertical directions, where a number, which is obtained by subtracting 1 from a number that is assigned to each node and is other than 0, indicates an object identifier assigned to all pixels included in the relevant block. In this case, an object map as shown in FIG. 14 can be reconstructed from the tree shown in FIG. 13.

The above-described tree structure or definition for the numerical sequence is just an example, and any method can be employed while the encoding and decoding sides can have common definition.

After completing the decoding of the object map, the object pixel value decoding unit 206 decodes the object pixel value for each object identifier, from the demultiplexed encoded data (see step S206).

The method of decoding the object pixel value for each object identifier depends on the method used in the encoding. Below, in order to provide simple explanations, it is assumed that the object pixel value was encoded in the order of the object identifier from the smallest to the largest.

For example, if each object pixel value was directly encoded, each value sequentially obtained by the relevant decoding is assigned to the object identifier in turn.

In addition, if prediction was performed using object pixel values in a neighbor block or previously-decoded object pixel values in the same block (i.e., the present block) and only a prediction residual was encoded, each value sequentially obtained by adding a value decoded from the relevant encoded data to a generated predicted value is assigned as the object pixel value to the object identifier in turn.

Generation of the predicted value should be performed using a method employed on the encoding side.

For example, in order to perform the prediction using a neighbor block, an average or median of object pixel values of the corresponding object identifiers in a neighbor block may be determined to be a predicted value.

In order to perform the prediction using previously-decoded object pixel values in the same block, if the object pixel value was decoded in the order of the object pixel value from the smallest to the largest, a value obtained by adding 1 to an object pixel value decoded immediately before may be determined to be a predicted value, or a predicted value may be generated using an object pixel value decoded immediately before and the number of remaining object pixel values which should be decoded.

The following is a specific example of the method for generating a predicted value by using an object pixel value decoded immediately before and the number of remaining object pixel values which should be decoded.

First, a range defined from the minimum value, that is obtained by adding 1 to an object pixel value decoded immediately before, to the maximum value, that is the maximum value among possible pixel values, is divided into partial ranges, the number of which coincides with the number of remaining object pixel values which should be decoded, where the partial ranges have the same size, and a median in a partial range which includes the minimum value is determined to be a predicted value.

For example, when 51 is an object pixel value decoded immediately before and the number of remaining object pixel values is 3, a range [52, 255] is divided into three partial ranges [52, 119], [120, 187], and [188, 255] which have the same size, and a median "85" in the range [52, 119] which includes the minimum value is determined to be a predicted value.

If partial ranges having just the same size cannot be obtained, partial ranges defined between integers may be generated in accordance with a predetermined rule, or partial ranges may be represented decimally. For example, a division method for producing partial ranges whose sizes increase such as "N, 2N, 3N, . . . " or decrease such as "N, N/2, N/3, . . . " may be employed.

In order to perform accurate decoding, the same dividing rule as that employed in the encoding should be used.

Additionally, the prediction may be performed by combining the prediction method based on a neighbor block with the prediction method using previously-decoded object pixel values in the same (present) block.

For example, the first object pixel value is predicted based on a neighbor block, and all other object pixel values are each predicted using an object pixel value decoded immediately before in the same block.

In another method, an object pixel value decoded immediately before in the same block is compared with a value predicted using a neighbor block, and a predicted value is determined according to a result of the comparison.

In another method, information that indicates which prediction method was used has been encoded separately so as to switch the prediction method. In this case, after decoding the information that indicates the prediction method, a predicted value is generated according to a result of the decoding.

In addition, only object pixel values that correspond to object identifiers appearing in the object map may have been encoded. In such a case, each unused object identifier is determined based on the obtained object map, and an object pixel value is assigned to each object identifier, except for the unused object identifier, in the order of decoding.

In the above explanation, the object pixel value or the prediction residual therefor was directly encoded. However, a quantized value computed therefor by using quantization parameters set for a target bitrate or quality may have been encoded.

In such a case, the relevant decoded value is subjected to inverse quantization so as to obtain the decoded value of the object pixel value.

After completing the decoding of the object pixel value, the predicted image generation unit 207 then generates a predicted image of block blk (see step S207).

Specifically, the predicted image is generated by assigning the object pixel value, which corresponds to each object identifier obtained by the object map, to each pixel.

The above-generated predicted image may be subjected to dithering.

In a predicted image generated using the object map and each object pixel value, there are only pixel values the number of which coincides with the object number. Therefore, the predicted image may have characteristics which differ from natural images. Owing to dithering, a variation that more approximates a natural image can be applied to the predicted image.

Although any method for performing dithering can be used, the same method as that employed by the encoding side should be used. If a parameter required for initializing a dithering apparatus is included in encoded data, it is decoded and used.

After obtaining the predicted image, the image signal of block blk is decoded by the image signal decoding unit 208 (see step S208).

The decoding of the image signal depends on a method employed by the encoding side. If generally known encoding such as MPEG-2 or H.264/AVC is employed, encoded data is subjected to entropy decoding, inverse binarization, inverse quantization, and inverse transformation such as IDCT, so as to decode the prediction residual. The image signal of block blk is reconstructed by adding the predicted image to the decoded prediction residual.

As an unusual case, when the object number is 1, only one kind of object map is present. Therefore, the amount of code may have been reduced by not encoding the object map corresponding to the relevant block. In such a case, encoded data of the object map is not decoded, and that only object map candidate is determined to be an object map for the relevant block. When the object number is 1, whether or not the object map is decoded should be determined according to the processing on the encoding side.

FIG. 15 shows an example of syntax applied to encoded data of each Mock, where the encoded data is generated in the first embodiment and received in the second embodiment.

In FIG. 15, num_objects denotes the object number, map_object denotes the object map, exist(i,j) is a function that returns TRUE if object identifier "i" exists in object map "j", otherwise, returns FALSE, residual_value_object[i] indicates a prediction residual for the object pixel value assigned to object identifier i, and "residuals" denotes a prediction residual for the image signal.

Below, examples of the data structure of additional information used for generating the predicted image in the embodiments will be explained.

First Example of Data Structure for Additional Information

Figure 16A:
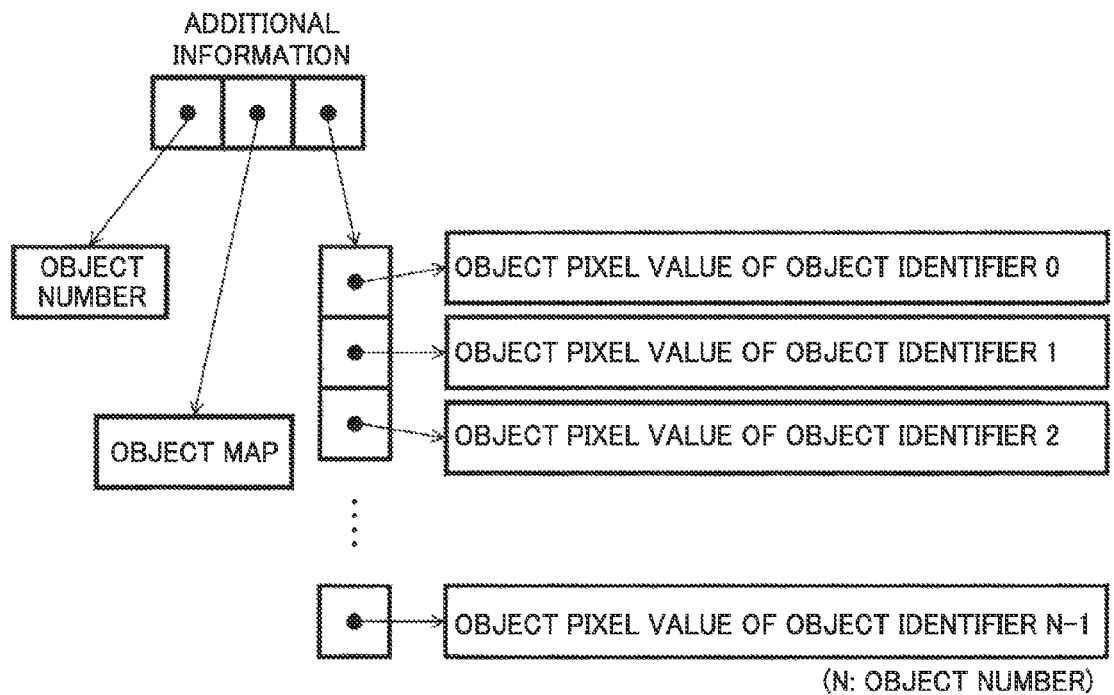
FIG. 16A is a diagram showing the first example of the data structure for additional information used for generating the predicted image.
Figure 16B:
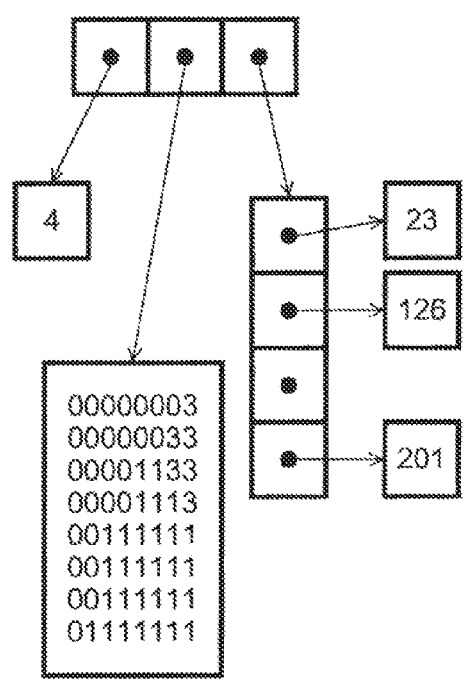
FIG. 16B is a diagram showing a specific example of the first example of the data structure.

FIGS. 16A and 16B are diagrams showing the first example of the data structure for the additional information used for generating the predicted image.

As shown in FIG. 16A, in order to predict the image signal for an encoding/decoding target, the object number, the object map, and the object pixel value for each object identifier are determined.

The object number N is an integer. The object map is an integer sequence that may include values from 0 to N-1 and has the same length as the number of pixels in the block. If no prediction is performed, the object pixel value is an integer having no sign. If prediction is performed, the object pixel value is an integer having a sign, that is, negative numbers are considered.

FIG. 16B shows a specific example of the additional information. Although the object number is 4, no pixel having an object identifier of 2 is present in the object map. Therefore, data of the object pixel value corresponding to the object identifier "2" is omitted.

Second Example of Data Structure for Additional Information

Figure 17A:
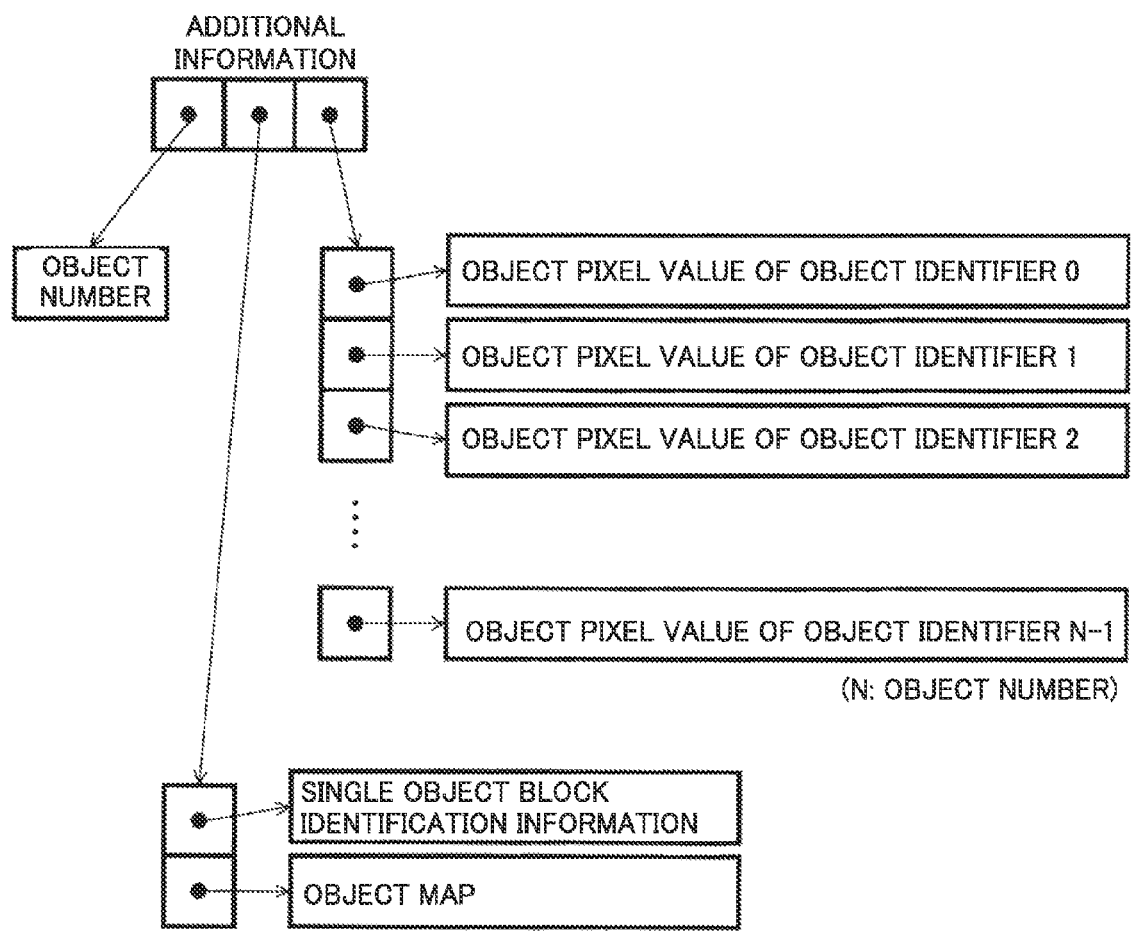
FIG. 17A is a diagram showing the second example of the data structure for additional information used for generating the predicted image.
Figure 17B:
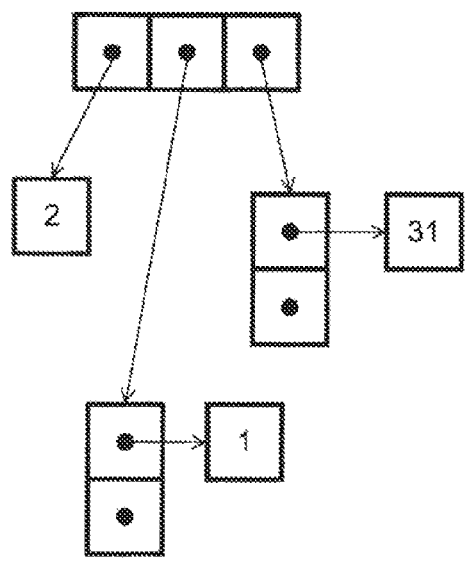
FIG. 17B is a diagram showing a specific example of the second example of the data structure.

FIGS. 17A and 17B are diagrams showing the second example of the data structure for the additional information used for generating the predicted image.

In this example, single object block identification information is provided prior to the object map. The single object block identification information is an integer that is one of 0 to N, where it is (i) one of 1 to N when the entire block has a single object, that is, all pixels of the block have the same object identifier, or (ii) 0 when there are a plurality of objects.

When the single object block identification information is 0, the following data of the object map and the object pixel value is similar to that in the above-described first example for the data structure.

When the single object block identification information is one of 1 to N, the object identifier is a value obtained by subtracting 1 from this information value. In other words, when all object identifiers are the same, a value obtained by adding 1 to the relevant object identifier is determined to be additional information as the single object block identification information.

FIG. 17B shows a specific example of the additional information. Although the object number is 2 in this example, there is no data for object map due to the single object block. In addition, since the single object identifier is 0 (i.e., 1-1), only the object pixel value "31" therefor is defined, and there is no other object pixel value (for object identifier of 1).

Third Example of Data Structure for Additional Information

Figure 18A:
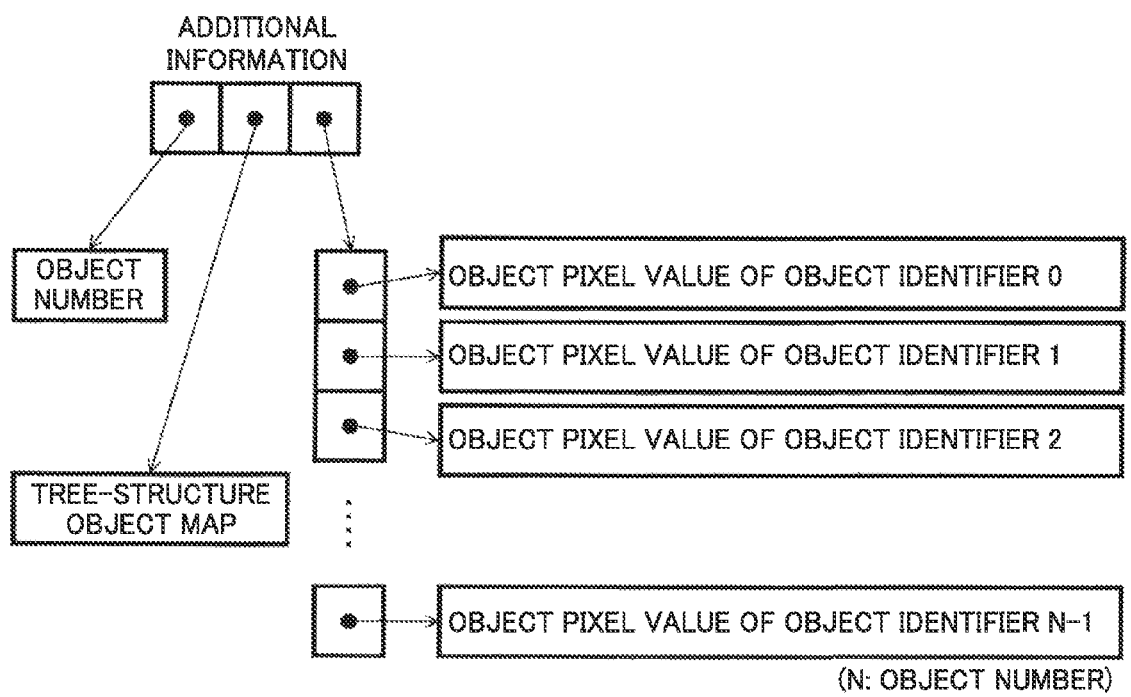
FIG. 18A is a diagram showing the third example of the data structure for additional information used for generating the predicted image.
Figure 18B:
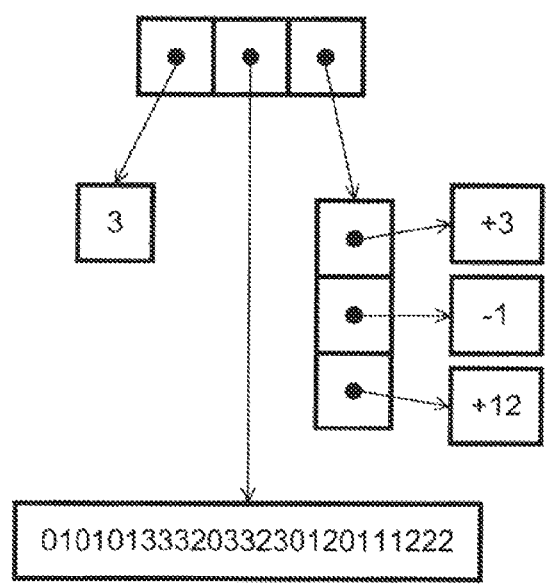
FIG. 18B is a diagram showing a specific example of the third example of the data structure.

FIGS. 18A and 18B are diagrams showing the third example of the data structure for the additional information used for generating the predicted image.

In this example, the object map is stored in a tree-structure format. Such a tree-structure object map represents an object map by using a tree structure, where values of respective nodes are scanned in a predetermined order, and the map is an integer sequence having a variable length.

FIG. 18B shows a specific example of the additional information. In this example, the object number is 3, and the tree-structure object map is stored in an object map format shown in FIG. 7. In addition, the object pixel value corresponds to a case that performs prediction, so that a negative value is included.

Fourth Example of Data Structure for Additional Information

Figure 19A:
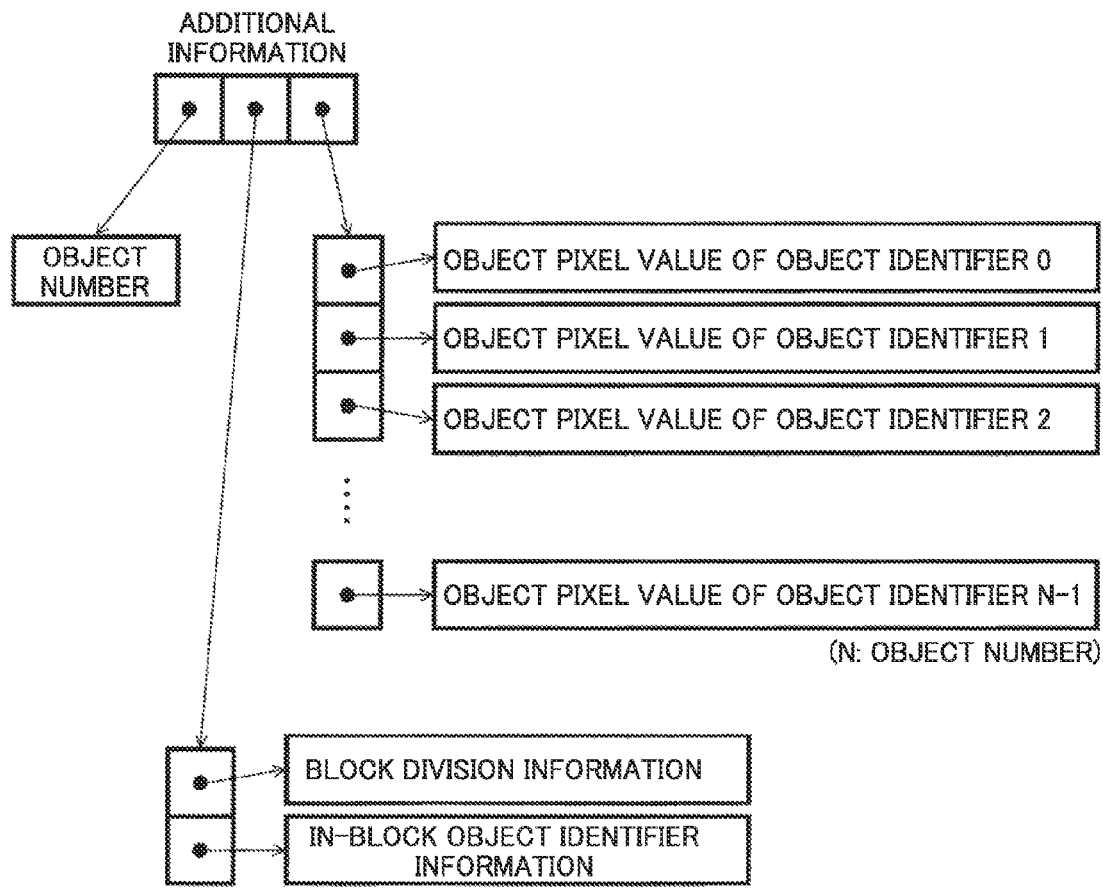
FIG. 19A is a diagram showing the fourth example of the data structure for additional information used for generating the predicted image.
Figure 19B:
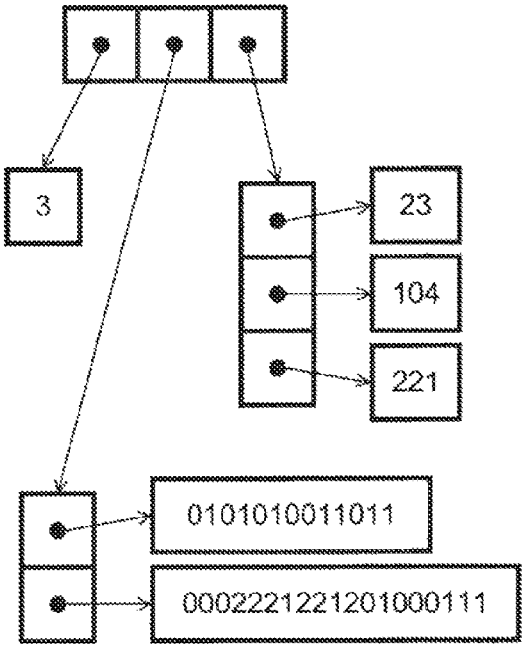
FIG. 19B is a diagram showing a specific example of the fourth example of the data structure.

FIGS. 19A and 19B are diagrams showing the fourth example of the data structure for the additional information used for generating the predicted image.

In this example, a tree-structure object map is stored as separate data items such as block division information and in-block object identifier information. The block division information indicates a result of scanning of nodes except for leaf nodes when using the tree-structure object map. The in-block object identifier information indicates a result of scanning of the leaf nodes when using the tree-structure object map.

FIG. 19B shows a specific example of the additional information. In this example, values obtained by scanning a tree-structure object map, which is explained above and shown in FIG. 6, are shown, where the nodes except for leaf nodes and the leaf nodes are separately scanned.

In the above-described first and second embodiments, all blocks in one frame are encoded and decoded in accordance with the claimed invention. However, the relevant processing may be applied to only part of the blocks, and the other blocks may be encoded by means of intraframe predictive encoding or motion compensation predictive encoding, which is employed by H.264/AVC or the like.

In such a case, it is necessary to encode and decode information that indicates a method employed for each block.

Additionally, in the above-described first and second embodiments, one frame is encoded and decoded. However, the claimed invention can be applied to video encoding by iterating the relevant processing for a plurality of frames. In addition, the processing may be applied to part of frames of a video, or part of blocks.

In such a case, since (presence of) an object has not only spatial continuity but also temporal continuity, it can be easily anticipated to extend and use definitions about reference pixels used for encoding the object map and a neighbor block used for predicting the object pixel value, not only in the spatial direction but also in the temporal direction.

The above-described image encoding and decoding operations may be implemented using a computer and a software program, where the program may be provided by storing it in a computer-readable storage medium, or through a network.

Figure 20:
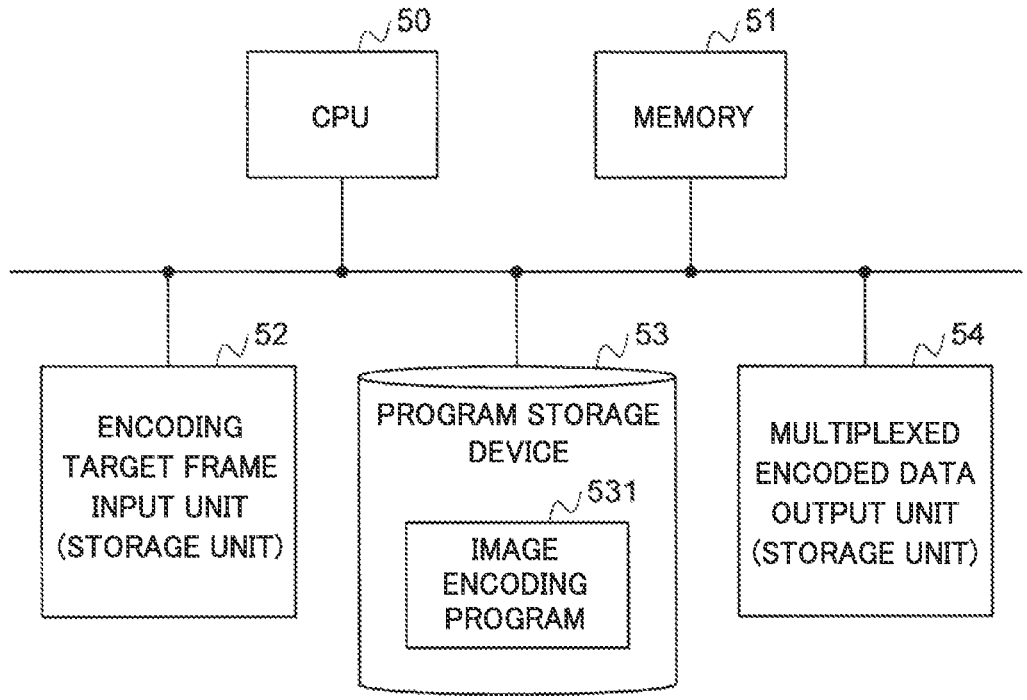
FIG. 20 is a diagram showing an example of a hardware configuration of an image encoding apparatus formed using a computer and a software program.

FIG. 20 shows an example of a hardware configuration of an image encoding apparatus formed using a computer and a software program. In the relevant system, the following elements are connected via a bus:
(i) a CPU 50 that executes the relevant program;
(ii) a memory 51 (e.g., RAM) that stores the program and data accessed by the CPU 50;
(iii) an encoding target frame input unit 52 that receives an image signal of an encoding target from a camera or the like, and may be a storage unit (e.g., disk device) which stores the image signal;
(iv) a program storage device 53 that stores an image encoding program 531 which is a software program for making the CPU 50 execute the above-explained operation of the first embodiment; and
(v) a multiplexed encoded data output unit 54 that outputs multiplexed encoded data via a network or the like, where the encoded data is generated by means of the image encoding program 531 that is loaded on the memory 51 and executed by the CPU 50, and the output unit may be a storage unit (e.g., disk device) which stores the multiplexed encoded data.

In addition, other hardware elements (not shown) are also provided so as to implement the relevant method, which are an object number storage unit, an object map storage unit, an object pixel value storage unit, a predicted image storage unit, an object number encoded data storage unit, an object map encoded data storage unit, an object pixel value encoded data storage unit, an image information encoded data storage unit, and the like.

Figure 21:
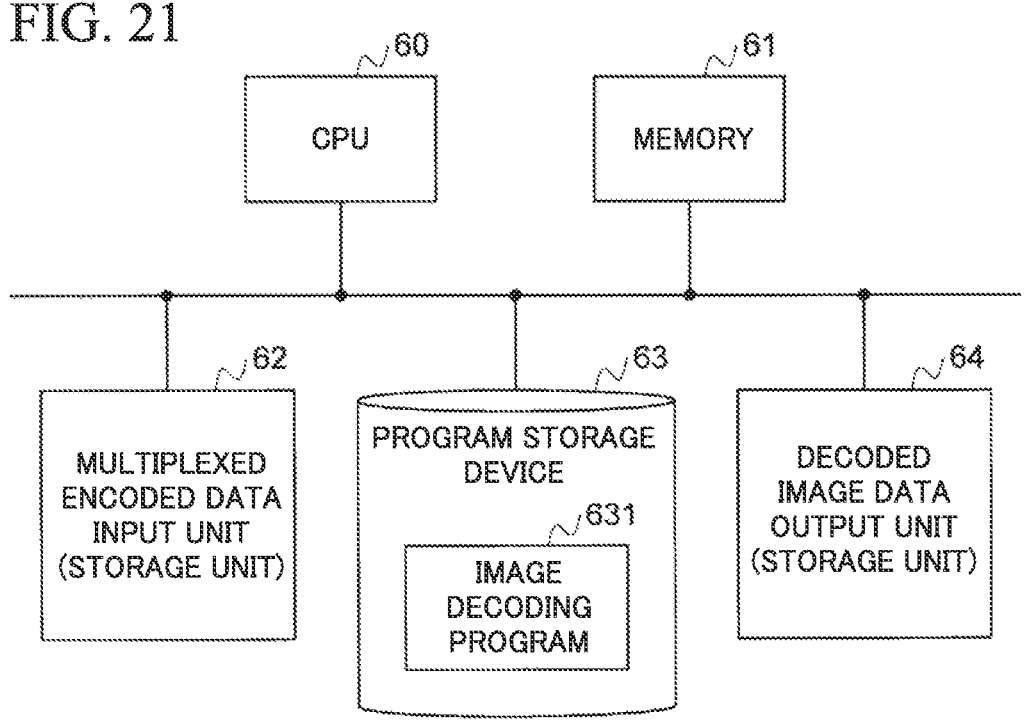
FIG. 21 is a diagram showing an example of a hardware configuration of an image decoding apparatus formed using a computer and a software program.

FIG. 21 shows an example of a hardware configuration of an image decoding apparatus formed using a computer and a software program. In the relevant system, the following elements are connected via a bus:
(i) a CPU 60 that executes the relevant program;
(ii) a memory 61 (e.g., RAM) that stores the program and data accessed by the CPU 60;
(iii) a multiplexed encoded data input unit 62 that receives multiplexed encoded data obtained by an image encoding apparatus which performs the above-explained method, where the input unit may be a storage unit (e.g., disk device) which stores the multiplexed encoded data;
(iv) a program storage device 63 that stores an image decoding program 631 which is a software program for making the CPU 60 execute the above-explained operation of the second embodiment; and
(v) a decoded image data output unit 64 that outputs decoded image data to an image reproduction device or the like, where the decoded image data is obtained by decoding multiplexed encoded data by means of the image decoding program 631 that is loaded on the memory 61 and executed by the CPU 60.

In addition, other hardware elements (not shown) are also provided so as to implement the relevant method, which are an object number storage unit, an object map storage unit, an object pixel value storage unit, a predicted image storage unit, an object number encoded data storage unit, an object map encoded data storage unit, an object pixel value encoded data storage unit, an image information encoded data storage unit, and the like.

Verification for Effects

Below, comparison between conventional methods (e.g., H.264/AVC) and the present method (according to the claimed invention) is shown.

1. Conceptual Comparison for Code Amount 1.1 Code Amount Required for Additional Information Additional information in conventional methods is information that indicates direction of each edge and is a two-dimensional vector. In contrast, additional information in the present method is object pixel values (scalar values or color vectors), the number of which coincides with the object number, and an object map (two-dimensional information). When a block of 16×16 pixels is processed and the object number is 4, the amount of bits required for the present method is approximately 68 times as large as that for the conventional methods, although the evaluation depends on defined conditions. If employing entropy encoding, "68 times" can be reduced to approximately "5 times".

1.2 Code Amount Required for Prediction Residual

In an image having a sharp edge, when a predicted image and an input image have considerably different object shapes, even if a corresponding prediction residual is converted to information in a frequency domain, the information cannot be efficiently concentrated onto a low-frequency area, thereby producing a vary large amount of code required for the prediction residual.

That is, in comparison with the conventional methods which can employ only linear representation, the present method that can represent any shape is able to have a smaller amount of code required for the prediction residual. Specifically, the amount of code required for the prediction residual in the present method can be reduced to a third of that for the conventional methods, although the evaluation depends on a target image or encoding conditions.

1.3 Total Amount of Code

Regarding an ordinary encoding rate, the amount of code required for the prediction residual in the conventional methods occupies 90% of the total amount of code. That is, when the total amount of code is assumed to be "100", the additional is 10 while the prediction residual is 90.

In contrast, when the present method quintuples the additional information and reduces the prediction residual to a third of that for the conventional methods, the total amount of code required for the present method can be 80.

2. Experimental Examples

Figure 22A:
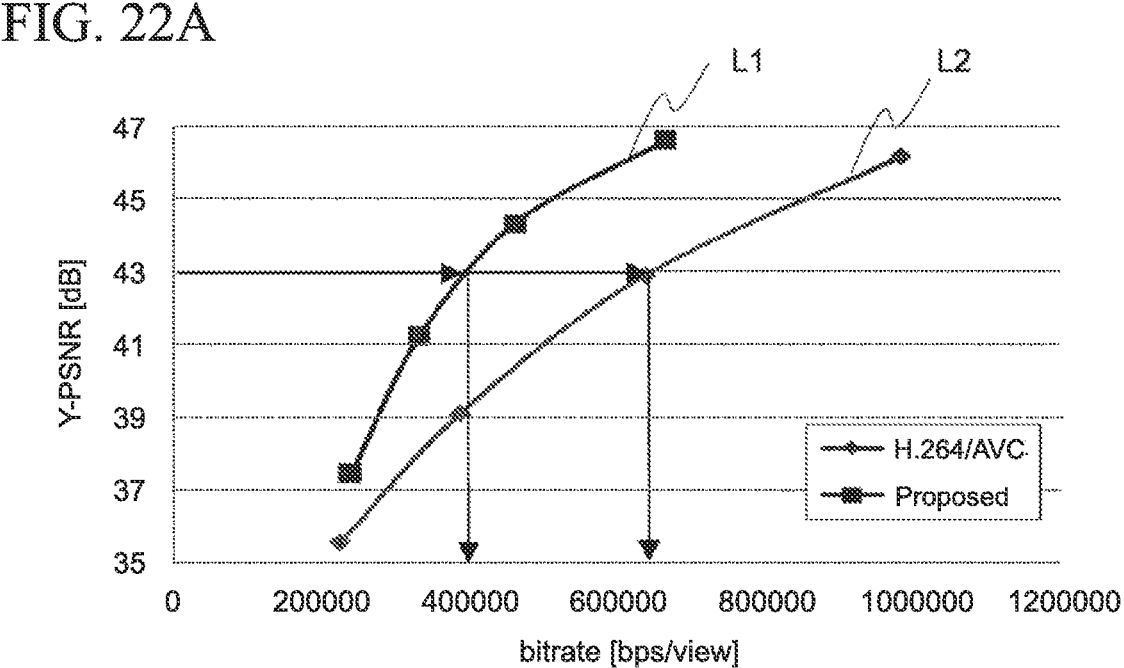
FIG. 22A is a diagram showing a result of comparison in an amount of generated code when performing the encoding using a conventional method and the present method.
Figure 22B:
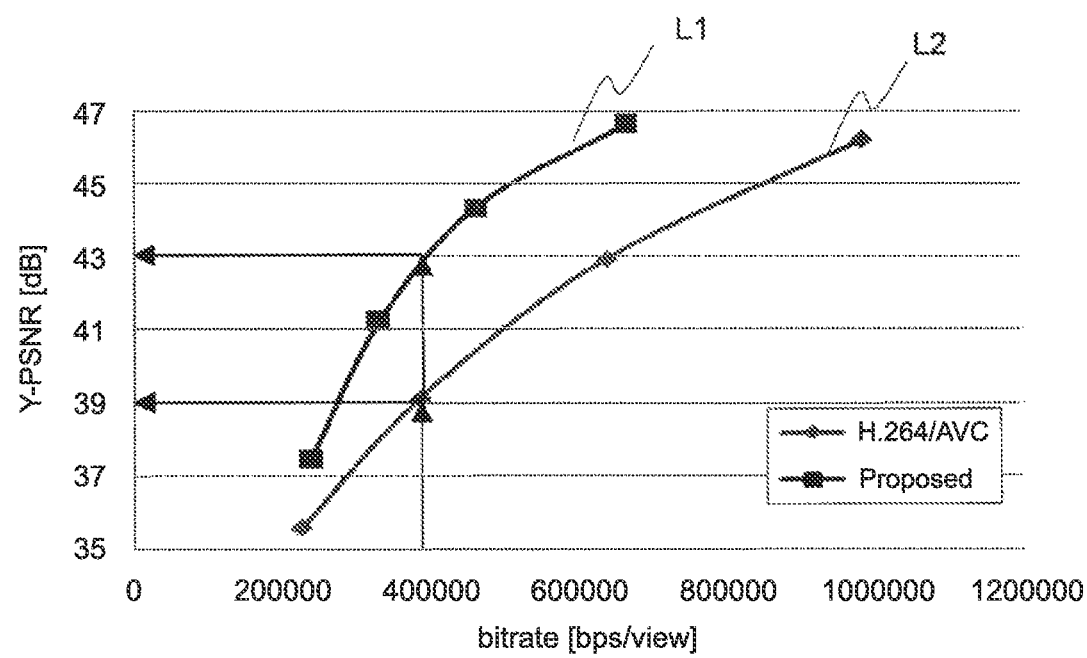
FIG. 22B is a diagram showing a result of comparison in image quality when performing the encoding using a conventional method and the present method.
Figure 23:
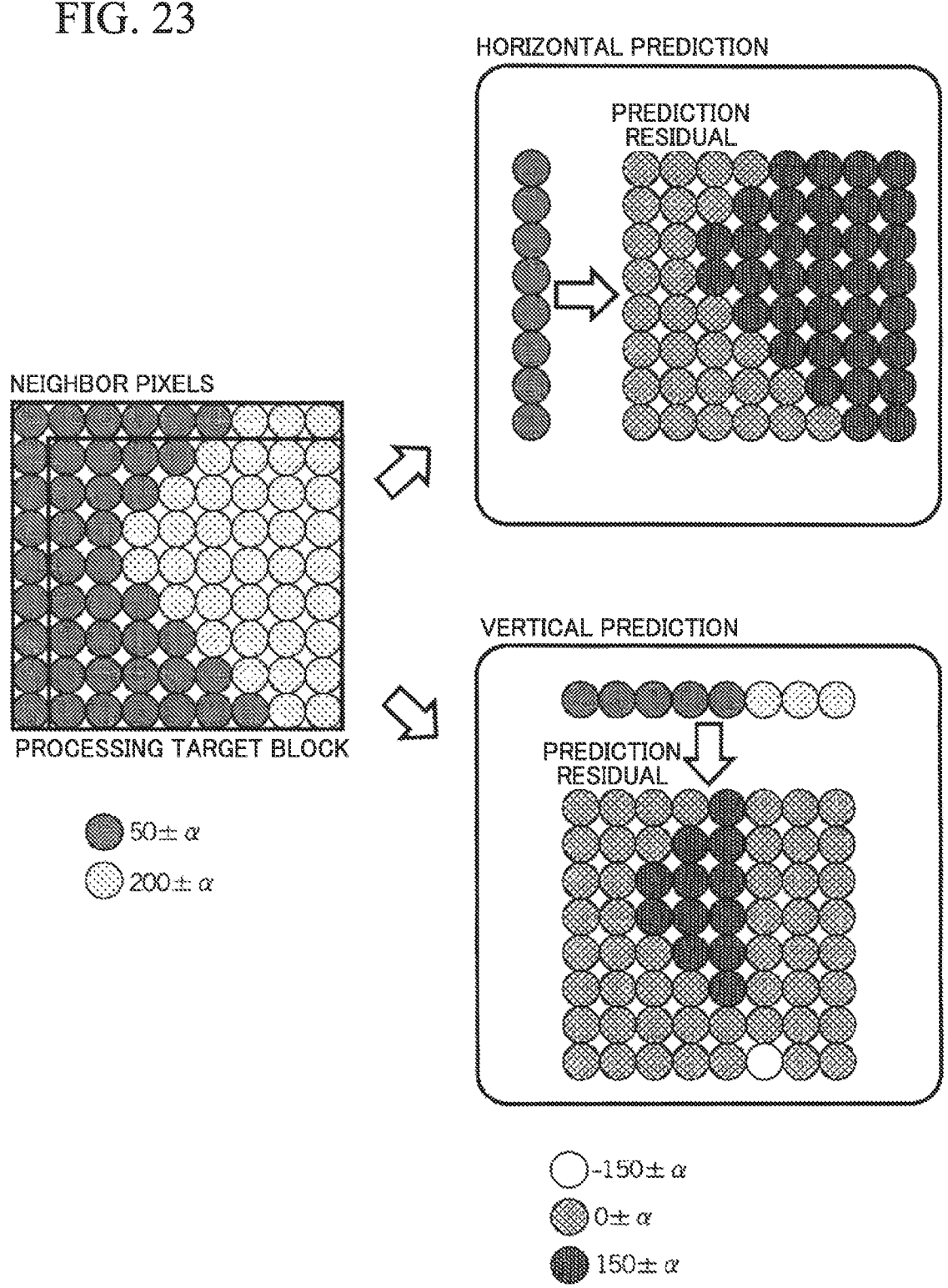
FIG. 23 is a diagram for explaining a problem to be solved by the present invention, where the diagram shows horizontal prediction and vertical prediction for a distance image.
Figure 24A:
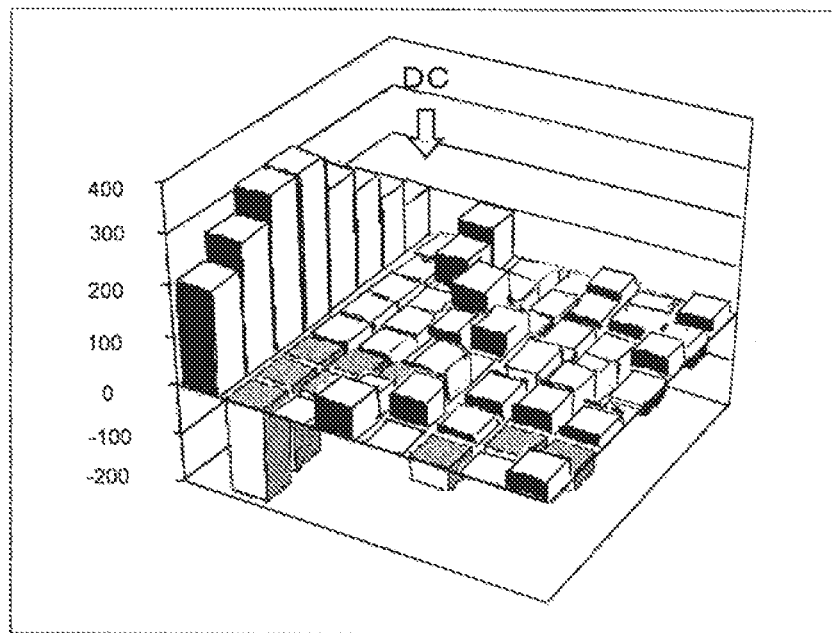
FIG. 24A is a diagram showing a result of subjecting a horizontal prediction residual shown in FIG. 23 to 8×8 two-dimensional DCT.
Figure 24B:
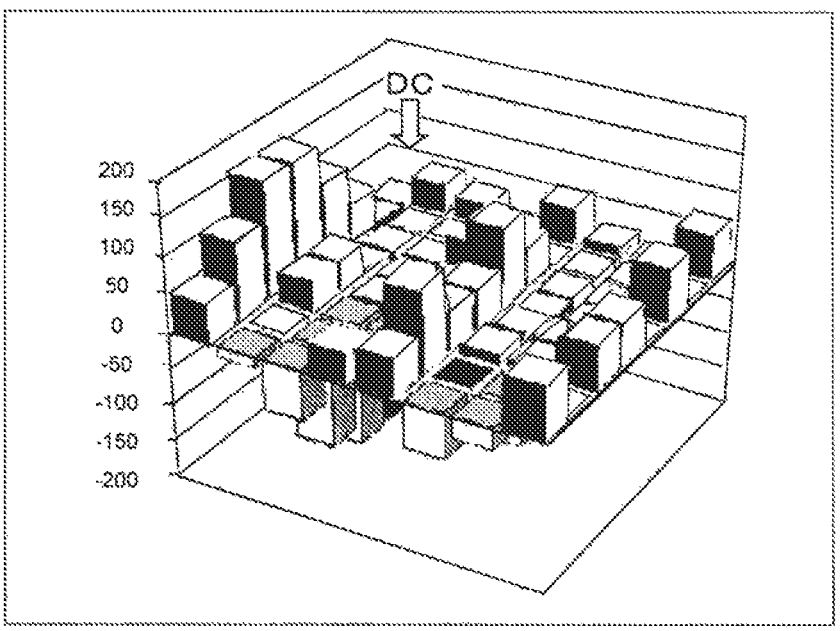
FIG. 24B is a diagram showing a result of subjecting a vertical prediction residual shown in FIG. 23 to 8×8 two-dimensional DCT.

FIGS. 22A and 22B respectively show results of comparison in an amount of generated code and image quality between a conventional method and the present method when encoding a sample image (called "ballet").

In the graphs of FIGS. 22A and 22B, "Y-PSNR" in the vertical direction indicates quality of the image (unit: dB) while "bitrate" in the horizontal direction indicates the amount of code (unit: bps/view), where the larger the value of Y-PSNR, the higher the image quality.

In FIGS. 22A and 22B, curve L1 represents a relationship between the amount of code and the image quality for the present method, while curve L2 represents a relationship between the amount of code and the image quality for the conventional method. Here, FIGS. 22A and 22B show the same graph.

2.1 Interpretation for Code Amount Reducing Effect (Refer to FIG. 22A)

According to the graph of FIG. 22A, when Y-PSNR is 43 dB, the conventional method (H.264/AVC) requires a code amount of approximately 650 kbps, while the present method requires a code amount of approximately 400 kbps. Therefore, when performing the encoding which produces the same quality, the present method can achieve a reduction of approximately 40% of the code amount.

2.2 Interpretation for Quality Improving Effect (Refer to FIG. 22B)

According to the graph of FIG. 22B, when "bitrate" is 400 kbps, the conventional method (H.264/AVC) produces a quality of approximately 39 dB, while the present method produces a quality of approximately 43 dB. Therefore, when performing the encoding with the same code amount, the present method can improve the image quality by 4 dB, in other words, achieve a reduction of approximately 60% in the amount of distortion.

While embodiments of the present invention have been described using the drawings, it is evident that these are exemplary embodiments of the claimed invention and are not to be considered as limiting. Therefore, additions, omissions, substitutions, and other modifications can be made without departing from the conceptual and technical scope of the present invention.

INDUSTRIAL APPLICABILITY

In accordance with the present invention, an accurate predicted image securing accurate edges can be produced for an object having a complex shape, thereby reducing the amount of code required for encoding the relevant prediction residual.

REFERENCE SYMBOLS 100 image encoding apparatus
101 encoding target frame input unit
102 encoding target frame memory
103 object number determination unit
104 object pixel value determination unit
105 object pixel value encoding unit
106 object map generation unit
107 object map encoding unit
108 predicted image generation unit
109 image signal encoding unit
110 multiplexing unit
200 image decoding apparatus
210 encoded data input unit
202 encoded data memory
203 demultiplex unit
204 object number determination unit
205 object map decoding unit
206 object pixel value decoding unit
207 predicted image generation unit
208 image signal decoding unit

The invention claimed is:

1. An image encoding method in which when transmitting or storing an image, a frame of the image is divided into predetermined-sized processing regions, and for each processing region, a pixel value of each pixel is predicted for the encoding, wherein the method comprising:
   an object number determination step that determines an object number that indicates the number of objects present in the processing region;
   an object pixel value determination step that determines one pixel value, which is assigned to and represents each individual object in the processing region, to be an object pixel value that is associated with an object identifier for identifying the relevant object;
   an object map generation step that generates, based on each object pixel value and the pixel value of each pixel in the processing region, an object map that indicates which object has been obtained at each pixel in the processing region, by using the object identifier;
   a predicted image generation step that generates a predicted image for the processing region by assigning the object pixel value to each pixel in accordance with the object map;
   an object map encoding step that encodes the object map;
   an object pixel value encoding step that encodes each object pixel value; and
   an image signal encoding step that performs predictive encoding of an image signal for the processing region by using the predicted image.

2. The image encoding method in accordance with claim 1, further comprising:
   an object number encoding step that encodes the object number determined by the object number determination step.

3. The image encoding method in accordance with claim 1, wherein:
   the object number determination step estimates the number of objects in the processing region based on information about the pixels in the processing region, and determines the estimated value to be the object number.

4. The image encoding method in accordance with claim 1, wherein the object pixel value encoding step:
   determines for each object identifier whether or not the object identifier is used in the relevant object map,
   encodes the object pixel value corresponding to the object identifier if it is used, and
   omits the encoding of the object pixel value corresponding to the object identifier if it is not used.

5. The image encoding method in accordance with claim 1, further comprising:
   a dithering step that subjects the predicted image to dithering, wherein:
   the image signal encoding step performs the predictive encoding of the image signal for the processing region by using the predicted image subjected to the dithering.

6. An image decoding method in which when decoding encoded data of an image, a frame of the image is divided into predetermined-sized processing regions, and for each processing region, a pixel value of each pixel is predicted for the decoding, wherein the method comprising:
   an object number determination step that determines an object number that indicates the number of objects present in the processing region;
   an object map decoding step that decodes an object map from the encoded data, where the object map indicates the object obtained at each pixel in the processing region, by using an object identifier;

an object pixel value decoding step that decodes, from the encoded data, an object pixel value assigned to each individual object identifier;

a predicted image generation step that generates a predicted image for the processing region by assigning the object pixel value to each pixel in accordance with the object map; and an image signal decoding step that decodes an image signal for the processing region by using the predicted image.

7. The image decoding method in accordance with claim 6, wherein:

the object number determination step decodes the object number from the encoded data, and determines the decoded number to be the object number.

8. An image decoding method in which when decoding encoded data of an image, a frame of the image is divided into predetermined-sized processing regions, and for each processing region, a pixel value of each pixel is predicted for the decoding, wherein the method comprising:

an object map decoding step that decodes an object map from the encoded data, where the object map indicates an object obtained at each pixel in the processing region, by using an object identifier;

an object pixel value decoding step that decodes, from the encoded data, an object pixel value assigned to each individual object identifier;

a predicted image generation step that generates a predicted image for the processing region by assigning the object pixel value to each pixel in accordance with the object map; and an image signal decoding step that decodes an image signal for the processing region by using the predicted image.

9. The image decoding method in accordance with claim 8, further comprising:

an object number determination step that determines an object number that indicates the number of the objects present in the processing region, wherein:

the object number determination step decodes the object number from the encoded data, and determines the decoded number to be the object number.

10. The image decoding method in accordance with any one of claims 6 and 8, wherein:

the object pixel value decoding step decodes only the object pixel value corresponding to each object identifier which appears in the object map.

11. The image decoding method in accordance with any one of claims 6 and 8, further comprising:

a dithering step that subjects the predicted image to dithering, wherein:

the image signal decoding step decodes the image signal for the processing region from the encoded data by using the predicted image subjected to the dithering.

12. An image encoding apparatus in which when transmitting or storing an image, a frame of the image is divided into predetermined-sized processing regions, and for each processing region, a pixel value of each pixel is predicted for the encoding, wherein the apparatus comprising:

an object number determination device that determines an object number that indicates the number of objects present in the processing region;

an object pixel value determination device that determines one pixel value, which is assigned to and represents each individual object in the processing region, to be an object pixel value that is associated with an object identifier for identifying the relevant object;

an object map generation device that generates, based on each object pixel value and the pixel value of each pixel in the processing region, an object map that indicates which object has been obtained at each pixel in the processing region, by using the object identifier;

a predicted image generation device that generates a predicted image for the processing region by assigning the object pixel value to each pixel in accordance with the object map;

an object map encoding device that encodes the object map;

an object pixel value encoding device that encodes each object pixel value; and an image signal encoding device that performs predictive encoding of an image signal for the processing region by using the predicted image.

13. The image encoding apparatus in accordance with claim 12, further comprising:

an object number encoding device that encodes the object number.

14. The image encoding apparatus in accordance with claim 12, wherein:

the object number determination device estimates the number of objects in the processing region based on information about the pixels in the processing region, and determines the estimated value to be the object number.

15. The image encoding apparatus in accordance with claim 12, wherein the object pixel value encoding device:

determines for each object identifier whether or not the object identifier is used in the relevant object map, encodes the object pixel value corresponding to the object identifier if it is used, and omits the encoding of the object pixel value corresponding to the object identifier if it is not used.

16. The image encoding apparatus in accordance with claim 12, further comprising:

a dithering device that subjects the predicted image to dithering, wherein:

the image signal encoding device performs the predictive encoding of the image signal for the processing region by using the predicted image subjected to the dithering.

17. An image decoding apparatus in which when decoding encoded data of an image, a frame of the image is divided into predetermined-sized processing regions, and for each processing region, a pixel value of each pixel is predicted for the decoding, wherein the apparatus comprising:

an object number determination device that determines an object number that indicates the number of objects present in the processing region;

an object map decoding device that decodes an object map from the encoded data, where the object map indicates the object obtained at each pixel in the processing region, by using an object identifier;

an object pixel value decoding device that decodes, from the encoded data, an object pixel value assigned to each individual object identifier;

a predicted image generation device that generates a predicted image for the processing region by assigning the object pixel value to each pixel in accordance with the object map; and an image signal decoding device that decodes an image signal for the processing region by using the predicted image.

18. The image decoding apparatus in accordance with claim 17, wherein:

the object number determination device decodes the object number from the encoded data, and determines the decoded number to be the object number.

19. An image decoding apparatus in which when decoding encoded data of an image, a frame of the image is divided into predetermined-sized processing regions, and for each processing region, a pixel value of each pixel is predicted for the decoding, wherein the apparatus comprising:
    an object map decoding device that decodes an object map from the encoded data, where the object map indicates an object obtained at each pixel in the processing region, by using an object identifier;
    an object pixel value decoding device that decodes, from the encoded data, an object pixel value assigned to each individual object identifier;
    a predicted image generation device that generates a predicted image for the processing region by assigning the object pixel value to each pixel in accordance with the object map; and
    an image signal decoding device that decodes an image signal for the processing region by using the predicted image.

20. The image decoding apparatus in accordance with claim 19, further comprising:
    an object number determination device that determines an object number that indicates the number of the objects present in the processing region, wherein:
        the object number determination device decodes the object number from the encoded data, and determines the decoded number to be the object number.

21. The image decoding apparatus in accordance with any one of claims 17 and 19, wherein:
    the object pixel value decoding device decodes only the object pixel value corresponding to each object identifier which appears in the object map.

22. The image decoding apparatus in accordance with any one of claims 17 and 19, further comprising:
    a dithering device that subjects the predicted image to dithering, wherein:
    the image signal decoding device decodes the image signal for the processing region from the encoded data by using the predicted image subjected to the dithering.

23. A non-transitory computer-readable storage medium which stores an image encoding program that makes a computer execute the image encoding method in accordance with claim 1.

24. A non-transitory computer-readable storage medium which stores an image decoding program that makes a computer execute the image decoding method in accordance with any one of claims 6 and 8.

* * * * *